United States Patent
Mazumder

(10) Patent No.: US 10,409,814 B2
(45) Date of Patent: *Sep. 10, 2019

(54) NETWORK COMMON DATA FORM DATA MANAGEMENT

(71) Applicant: International Business Machines Corporation, Armonk, NY (US)

(72) Inventor: Sourav Mazumder, San Ramon, CA (US)

(73) Assignee: International Business Machines Corporation, Armonk, NY (US)

(*) Notice: Subject to any disclaimer, the term of this patent is extended or adjusted under 35 U.S.C. 154(b) by 234 days.

This patent is subject to a terminal disclaimer.

(21) Appl. No.: 15/416,982

(22) Filed: Jan. 26, 2017

(65) Prior Publication Data

US 2018/0210918 A1 Jul. 26, 2018

(51) Int. Cl.
*G06F 16/30* (2019.01)
*G06F 16/2453* (2019.01)
(Continued)

(52) U.S. Cl.
CPC ........ *G06F 16/24544* (2019.01); *G06F 16/13* (2019.01); *G06F 16/2365* (2019.01); *G06F 16/2455* (2019.01); *G06F 16/24554* (2019.01)

(58) Field of Classification Search
CPC .......... G06F 17/30371; G06F 9/45558; G06F 2009/45579; G06F 3/0664; G06F 9/5077; G06F 11/1451; G06F 12/0866; G06F 2009/45583; G06F 3/06; G06F 17/30303; G06F 17/30563; G06F 17/30; G06F 9/5083; G06F 17/30286; G06F 17/30595; G06F 17/30283; G06F 17/30477;
(Continued)

(56) References Cited

U.S. PATENT DOCUMENTS

2004/0122863 A1* 6/2004 Sidman ............. H04L 29/12169
707/999.104
2008/0016023 A1 1/2008 Aspinall
(Continued)

FOREIGN PATENT DOCUMENTS

CN 103761291 A 4/2014

OTHER PUBLICATIONS

IBM, List of IBM Patents or Patent Applications Treated as Related, Appendix P, dated Sep. 22, 2017, 2 pages.
(Continued)

*Primary Examiner* — Anh Ly
(74) *Attorney, Agent, or Firm* — Tihon Poltavets

(57) ABSTRACT

Aspects of the disclosure relate to Network Common Data Form (NetCDF) data management using a shared pool of configurable computing resources. A processing engine may be built to access a set of NetCDF data. The processing engine may be built by compiling a data frame software framework and compiling a Java library software framework. The set of NetCDF data may be received by the processing engine. A set of established data derived from the set of NetCDF data may be established using the processing engine. A set of operations on the set of established data may be processed. The processing may occur in a distributed fashion using the shared pool of configurable computing resources and the processing engine.

16 Claims, 13 Drawing Sheets

(51) Int. Cl.
*G06F 16/13* (2019.01)
*G06F 16/2455* (2019.01)
*G06F 16/23* (2019.01)

(58) Field of Classification Search
CPC .......... G06F 16/24544; G06F 16/2365; G06F 16/24554; G06F 16/2455; G06F 16/13; G06F 16/00
See application file for complete search history.

(56) References Cited

U.S. PATENT DOCUMENTS

| | | | | |
|---|---|---|---|---|
| 2013/0057580 A1* | 3/2013 | Schoeberl | ............... | G09G 5/00 345/630 |
| 2013/0173631 A1 | 7/2013 | Roe et al. | | |
| 2014/0025682 A1* | 1/2014 | Okuma | ............... | G06F 16/5846 707/740 |
| 2014/0201667 A1* | 7/2014 | Schoeberl | ........... | G06F 3/04842 715/771 |
| 2014/0208924 A1* | 7/2014 | Aiylam | ................ | G10H 1/38 84/613 |
| 2014/0359089 A1* | 12/2014 | Davis | ................ | G06F 15/177 709/221 |
| 2015/0319182 A1* | 11/2015 | Natarajan | ............... | G06F 21/53 726/24 |
| 2015/0363167 A1* | 12/2015 | Kaushik | ............... | G06F 16/221 707/753 |
| 2016/0092475 A1* | 3/2016 | Stojanovic | ............ | G06F 16/211 707/805 |
| 2016/0103912 A1* | 4/2016 | Daggett | ............ | G06F 17/30734 707/736 |
| 2016/0105402 A1* | 4/2016 | Soon-Shiong | ...... | H04L 63/0428 713/164 |
| 2016/0328410 A1* | 11/2016 | Schnase | .............. | G06F 17/3007 707/E17.045 |
| 2016/0335291 A1* | 11/2016 | Schnase | ............ | G06F 17/30292 707/E17.32 |
| 2017/0011089 A1* | 1/2017 | Bermudez Rodriguez | .................. | G06F 17/30445 707/E17.014 |
| 2018/0113936 A1* | 4/2018 | Balachandran | ....... | G06F 16/221 |
| 2019/0124051 A1* | 4/2019 | Soon-Shiong | ...... | H04L 63/0428 |

OTHER PUBLICATIONS

Pending U.S. Appl. No. 15/696,405, filed Sep. 6, 2017 entitled: "Network Common Data Form Data Management", 71 pages.
Chou et al.; "FastQuery: A Parallel Indexing System for Scientific Data"; Lawrence Berkeley Lab.; Sep. 26, 2011; <http://www.mcs.anl.gov/events/workshops/iasds11/papers/PID2005987.pdf>.
Li et al.; "Parallel netCDF: A Parallel I/O Library for NetCDF File Access"; Nov. 15, 2016; <http://trac.mcs.anl.gov/projects/parallel-netcdf/wiki/WikiStart?format=pdf>.
Wang et al.; "SparkArray: An Array-based Scientific Data Management System Built on Apache Spark"; University of Chicago; Aug. 27, 2016; <http://www.nas-conference.org/NAS-2016/camera_ready/13.pdf>.
GitHub; "NetCDF reading from GeoTrellis into Spark"; <https://github.com/lossyrob/netcdf-geotrellis-spark-read-test>.
Unidata; "NetCDF-Java library version 4.5.5"; <http://www.unidata.ucar.edu/blogs/news/entry/netcdf_java_library_version_44>.
Mell, Peter, et al., The NIST Definition of Cloud Computing, National Institute of Standards and Technology, Oct. 7, 2009, Version 15, NIST, Gaithersburg, MD, US.

* cited by examiner

NETWORK COMMON DATA FORM DATA MANAGEMENT

BACKGROUND

This disclosure relates generally to computer systems and, more particularly, relates to Network Common Data Form (NetCDF) data management using a shared pool of configurable computing resources. NetCDF data format may be used to process large volumes of data. As the amount of data in an NetCDF data format increases, the need for efficient management or transformation of the NetCDF data format also increases.

SUMMARY

Aspects of the disclosure relate to the integration of multiple software frameworks to process large volumes of Network Common Data Form (NetCDF) data. Disclosed aspects may integrate the frameworks to build a processing engine to access a set of NetCDF data. Features may receive the set of NetCDF data and transform the NetCDF data into a set of established data. Aspects of the disclosure may perform a set of operations on the set of established data derived from the NetCDF data.

Disclosed aspects relate to NetCDF data management using a shared pool of configurable computing resources. A processing engine may be built to access a set of NetCDF data. The processing engine may be built by compiling a data frame software framework and compiling a Java library software framework. The set of NetCDF data may be received by the processing engine. A set of established data derived from the set of NetCDF data may be established using the processing engine. A set of operations on the set of established data may be processed. The processing occurs in a distributed fashion using the shared pool of configurable computing resources used by the processing engine.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
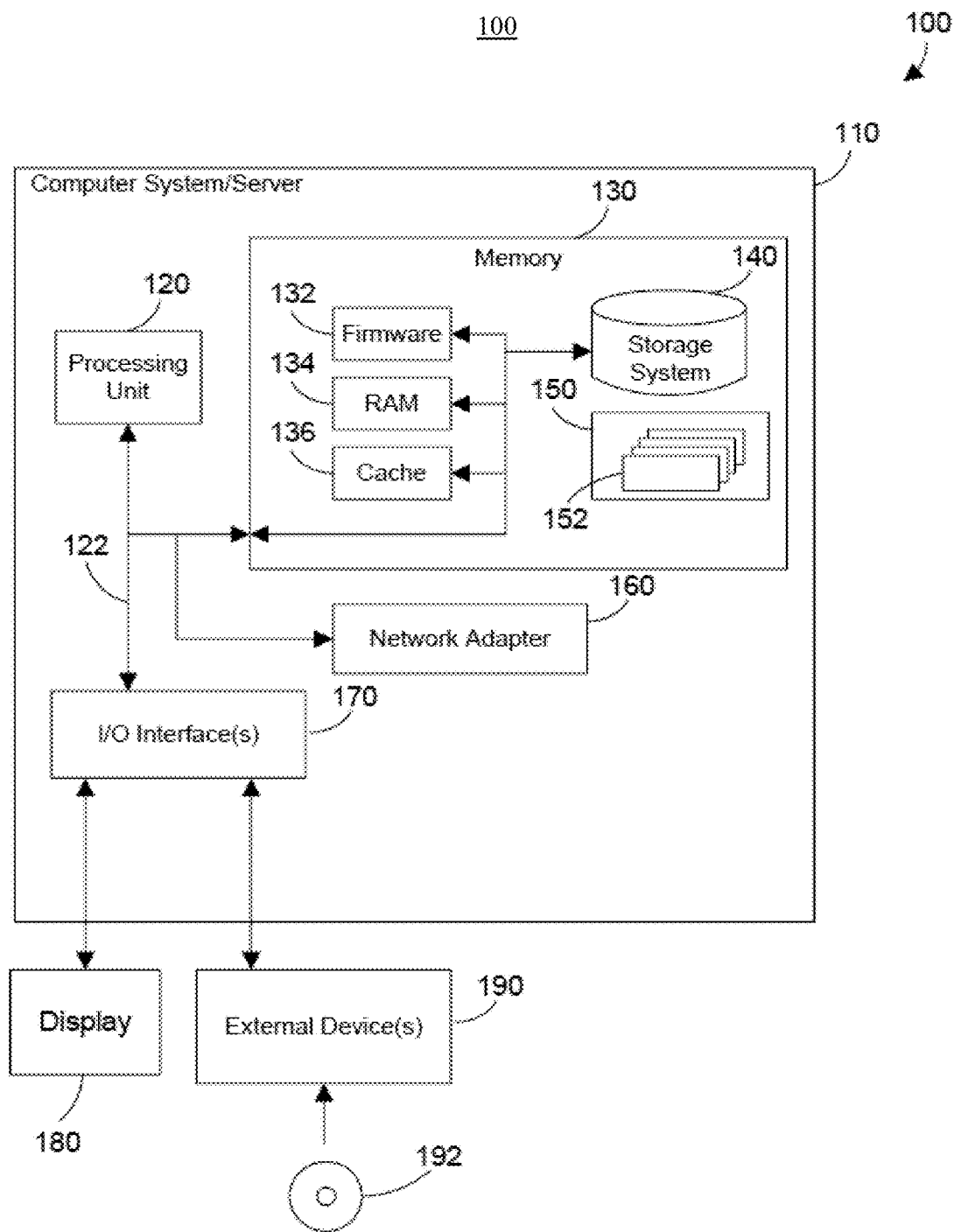
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to the integration of multiple software frameworks to process large volumes of Network Common Data Form (NetCDF) data. Features may integrate the DataFrame abstraction from Apache Spark (trademark of The Apache Software Foundation) which may include DataFrameReader and DataFrameWriter interfaces, and a Java (trademark of Oracle) library for reading and writing NetCDF data from Unidata (trademark of Rocket Software, Inc). Disclosed aspects may integrate the frameworks to build a processing engine to access a set of NetCDF data. Features may receive the set of NetCDF data and transform the NetCDF data into a set of established data (in a commonly used format). Aspects of the disclosure may perform a set of operations on the set of established data derived from the NetCDF data.

NetCDF may relate to a data format used by the global scientist community for storing and exchanging geo-spatial data. NetCDF may include a set of software libraries and self-describing, machine-independent data formats that support the creation, access, and sharing of array-oriented scientific data. NetCDF may have applications in climatology, meteorology, oceanography, and Geographic Information Systems (GIF), as well as other applications. These applications may desire processing of large volumes of data. Data scientists and data analysts may work with large volumes of NetCDF data. There may be a desire for the application of parallel computation on large volumes of NetCDF data. Features may allow the reading and writing of large volumes of NetCDF data at scale using a standard distributed large scale data processing framework. Disclosed aspects propose the use of a component such as Apache Spark or Apache Flink (trademark of The Apache Software Foundation) as the distributed processing framework. The integration of Apache Spark (or Apache Flink, or the like) and a Java library may allow for minimum coding and deployment challenges, little dependency on unnecessary abstractions and concepts, easy externalization of nuances related to NetCDF files, and the processing of multiple files in parallel in scale without writing codes.

Aspects of the disclosure include a computer-implemented method, system, and computer program product for NetCDF data management using a shared pool of configurable computing resources. A processing engine may be built to access a set of NetCDF data. The processing engine may be built by compiling a data frame software framework and compiling a Java library software framework. The set of NetCDF data may be received by the processing engine. A set of established data derived from the set of NetCDF data may be established using the processing engine. A set of operations on the set of established data may be processed. The processing occurs in a distributed fashion using the shared pool of configurable computing resources and the processing engine.

In embodiments, features may compile an Apache Spark/Flink framework and a Java library software framework from a Unidata tool to build the processing engine. In embodiments, disclosed aspects may transform the set of NetCDF data to the set of established data, wherein the set of established data has a tuple-table format. In various embodiments, aspects of the disclosure may introduce a set of implementation code to a data frame reader module and a data frame writer module. In various embodiments, features may construct a data frame implementation for NetCDF data in an external library. In certain embodiments, aspects of the disclosure may arrange a group of dimensions in a row-major format. In certain embodiments, disclosed aspects may arrange a group of variables in a column-major format. In certain embodiments, aspects of the disclosure may utilize a hybrid columnar technique to generate a cluster of data chunks to process a set of operations. Altogether, performance or efficiency benefits related to data access management may occur. Aspects may save computing resources such as bandwidth, processing, or memory. Overall, memory may be saved through NetCDF data management. NetCDF data management may allow for the transformation of large volumes of NetCDF data into a set of established data, which may be processed at scale by a processing engine. The set of established data may be transformed into a tuple-table format, an index, rows, columns, clusters, or the like. The transformation of the NetCDF data may allow specific datasets to be easily and efficiently located, utilizing less memory. Other methods of saving memory through NetCDF data management may also be possible.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
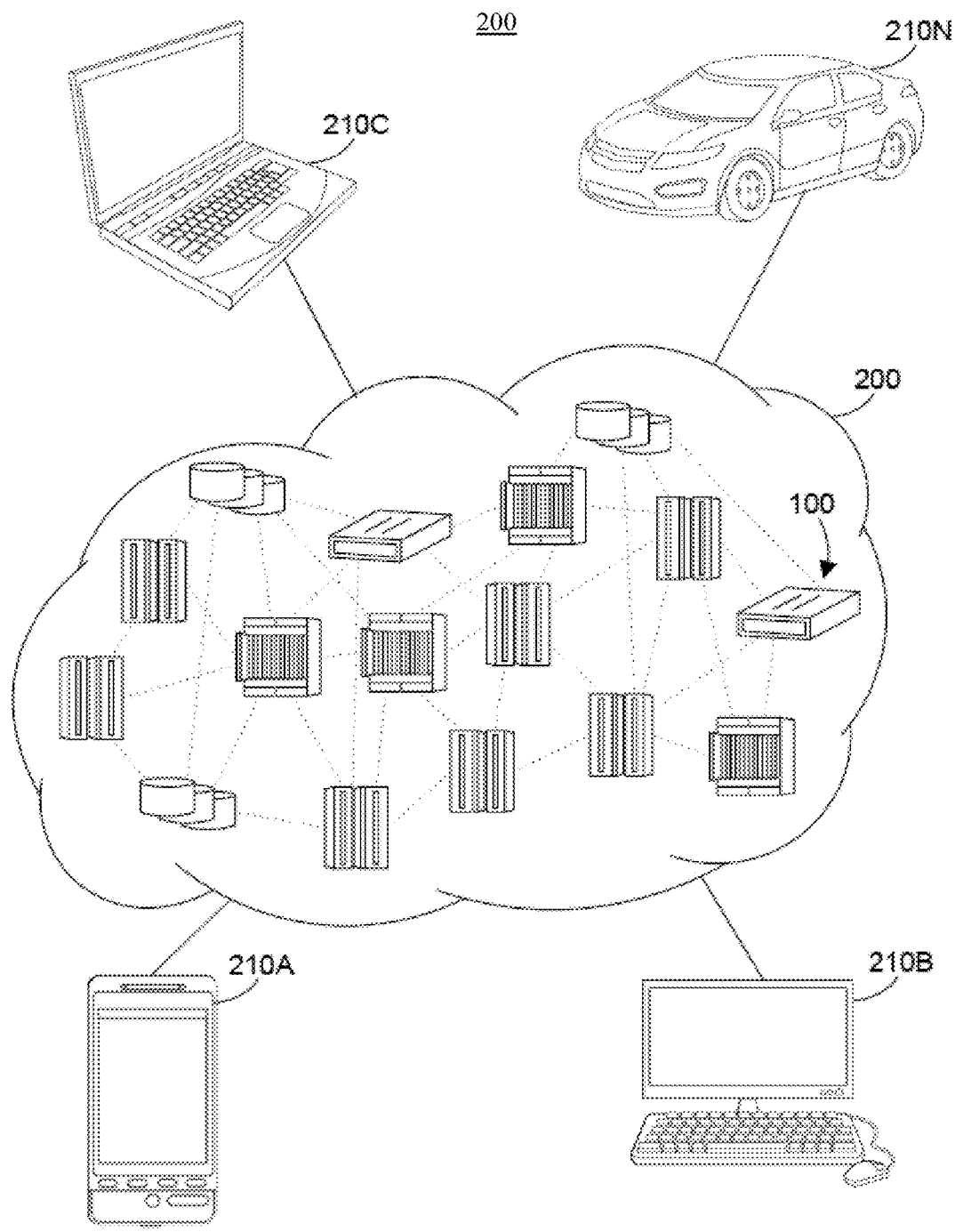
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
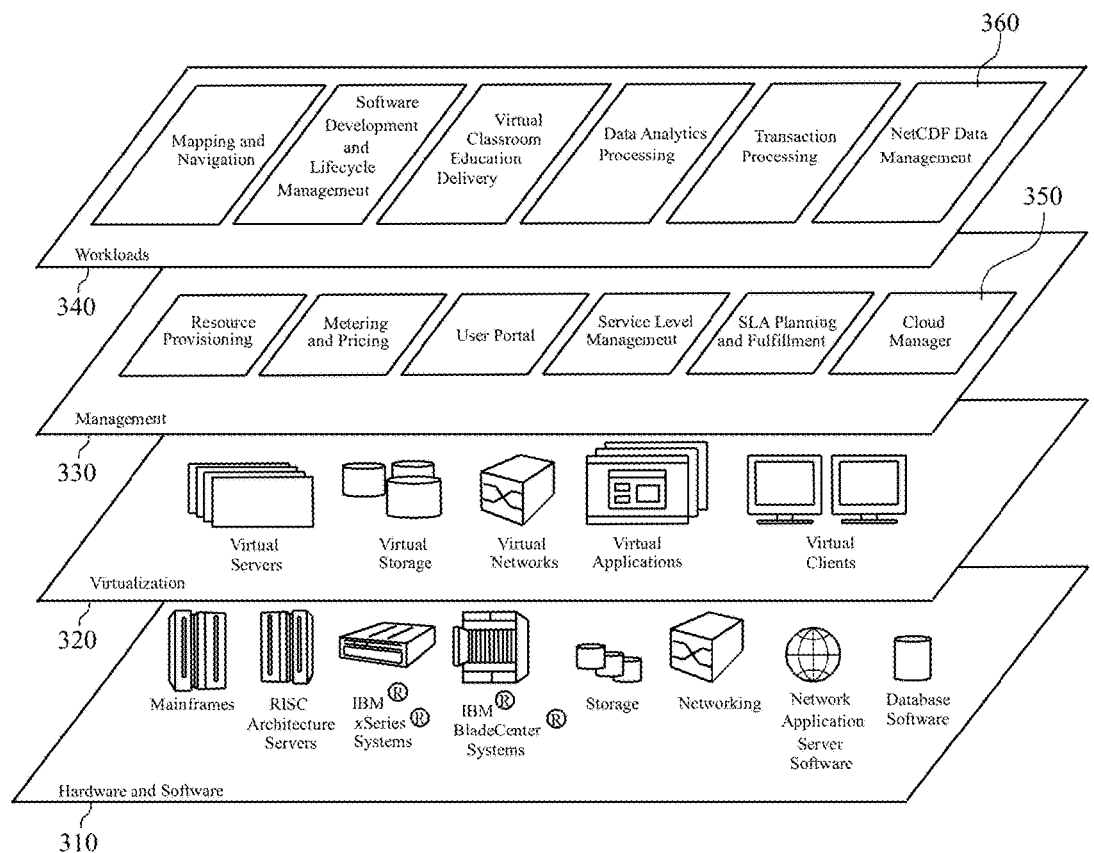
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a NetCDF data management layer 360, which relates to using a database driver as discussed in more detail herein.

Figure 4:
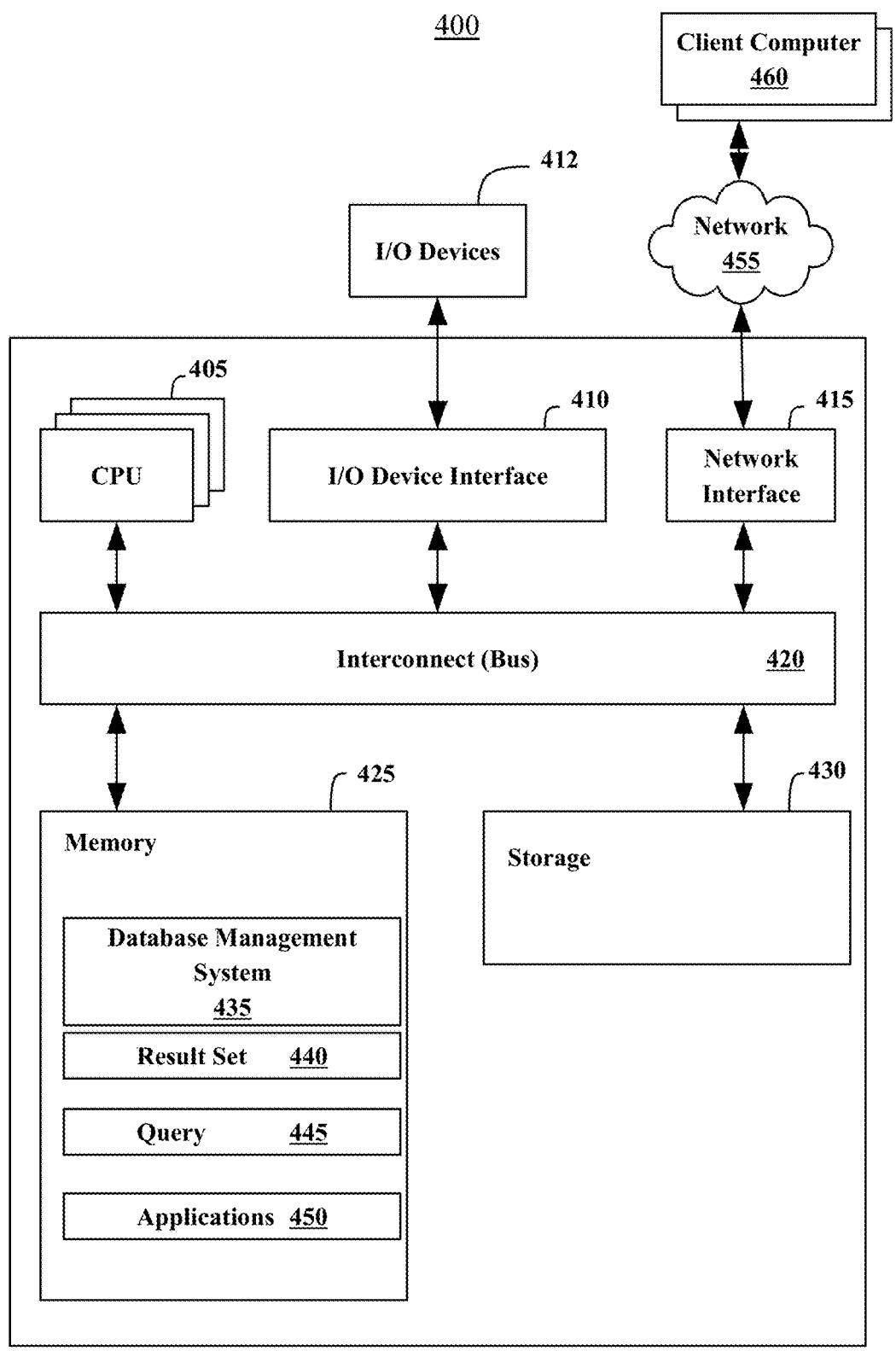
FIG. 4 illustrates an example representation of a computer system connected to a client computer via a network according to embodiments.

FIG. 4 illustrates an example representation of a computer system 400 connected to one or more client computers 460 via a network 455, according to some embodiments. For the purposes of this disclosure, computer system 400 may represent practically any type of computer, computer system, or other programmable electronic device, including but not limited to, a client computer, a server computer, a portable computer, a handheld computer, an embedded controller, etc. In some embodiments, computer system 400 may be implemented using one or more networked computers, e.g., in a cluster or other distributed computing system.

The computer system 400 may include, without limitation, one or more processors (CPUs) 105, a network interface 415, an interconnect 420, a memory 425, and a storage 430. The computer system 400 may also include an I/O device interface 410 used to connect I/O devices 412, e.g., keyboard, display, and mouse devices, to the computer system 400.

Each processor 405 may retrieve and execute programming instructions stored in the memory 425 or storage 430. Similarly, the processor 405 may store and retrieve application data residing in the memory 425. The interconnect 420 may transmit programming instructions and application data between each processor 405, I/O device interface 410, network interface 415, memory 425, and storage 430. The interconnect 420 may be one or more busses. The processor 405 may be a single central processing unit (CPU), multiple CPUs, or a single CPU having multiple processing cores in various embodiments. In one embodiment, a processor 405 may be a digital signal processor (DSP).

The memory 425 may be representative of a random access memory, e.g., Static Random Access Memory (SRAM), Dynamic Random Access Memory (DRAM), read-only memory, or flash memory. The storage 430 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 415 may be configured to transmit data via the communications network 455.

The memory 425 may include a database management system (DBMS) 435, a result set 440, a query 445, and applications 450. Although these elements are illustrated as residing in the memory 425, any of the elements, or combinations thereof, may reside in the storage 430 or partially in the memory 425 and partially in the storage 430. Each of these elements will be described in greater detail in accordance with FIG. 5.

The network 455 may be any suitable network or combination of networks and may support any appropriate protocol suitable for communication of data and/or code to/from the server computer system 400 and the client computer system 460. In some embodiments, the network 455 may support wireless communications. In other embodiments, the network 455 may support hardwired communications. The network 455 may be the Internet and may support Internet Protocol in some embodiments. In other embodiments, the network 455 may be implemented as a local area network (LAN) or a wide area network (WAN). The network 455 may also be implemented as a cellular data network. Although the network 455 is shown as a single network in the figures, one or more networks of the same or different types may be included.

The client computer system 460 may include some or all of the hardware and software elements of the computer system 400 previously described. As shown, there may be one or more client computers 460 connected to the computer system 400 via the network 455. In some embodiments, one or more client computers 460 may send a query 445 by network 455 to computer system 400 and receive a result set 440.

Figure 5:
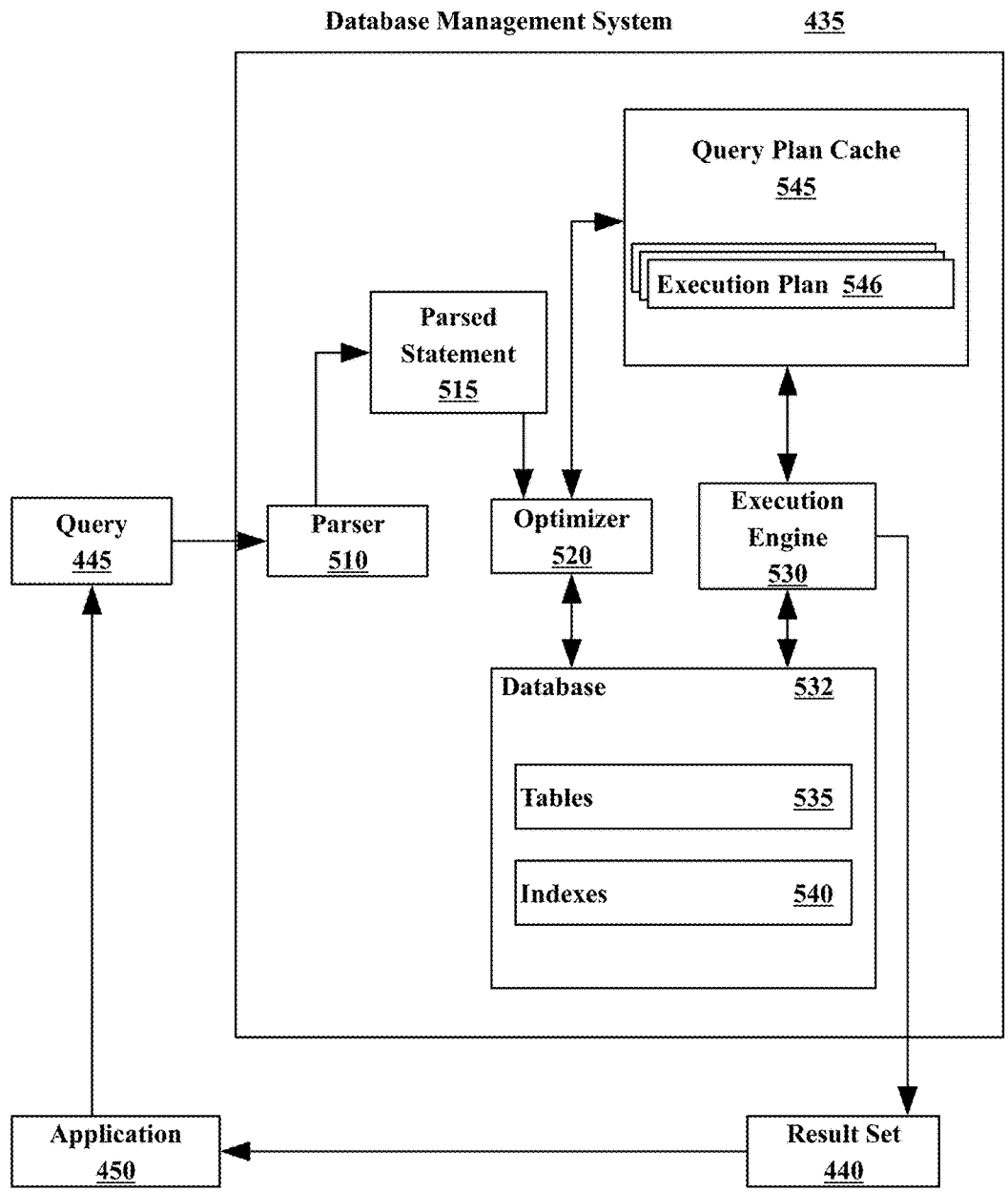
FIG. 5 illustrates an example database management system (DBMS) according to embodiments.

FIG. 5 illustrates an example database management system (DBMS) 435. The DBMS 435 may include a parser 510, an optimizer 520, an execution engine 530, and a database 532. The parser 510 may receive a database query 445 from an application 450. In some embodiments, the database query 445 may be in the form of a Structured Query Language (SQL) statement. The parser 510 may generate a parsed statement 515. The parser 510 may send the parsed statement 515 to an optimizer 520. The optimizer 520 may attempt to optimize the parsed statement. In some embodiments, optimizing may improve the performance of the database query 445 by, for example, reducing the amount of time it takes to provide a user with a response. The optimizer 520 may generate an execution plan 546 (may also be referred to as a query plan or an access plan), which may be maintained in a query plan cache 545, according to some embodiments. The query plan cache 545 may include one or more execution plans 546, including the current execution plan as well as previously used execution plans. Once an execution plan 546 is generated, the execution plan 546 may be sent to the execution engine 530. The execution engine 530 may execute the query 445. Executing the query 445 may include finding and retrieving data in the database tables 535 that satisfies the criteria supplied in the query 445. The execution engine 530 may store the data returned matching the query 445 in a result set 440. The DBMS 435 may return the result set 440 to an application 450, such as the application in which the database query 445 was generated, as a response to the database query 445.

A database 532 may include one or more tables 535 and, in some embodiments, one or more indexes 540. A database table 535 may organize data into rows and columns. Each row of a database table 535 may correspond to an individual entry, a tuple, or a record in the database 532. A column may define what is stored in each entry, tuple, or record. In some embodiments, columns of a table 535 may also be referred to as fields or attributes. Each table 535 within the database 532 may have a unique name. Each column within a table 535 may also have a unique name. A row, tuple, or record, however, within a particular table 535 may not be unique, according to some embodiments. A database 532 may also include one or more indexes 540. An index 540 may be a data structure that may inform the DBMS 435 of the location of a particular record within a table 535 if given a particular indexed column value. In some embodiments, the execution engine 530 may use the one or more indexes 540 to locate data within a table 535. In other embodiments, the execution engine 530 may scan the tables 535 without using an index 540.

As mentioned herein, the optimizer 520 creates the query access plan. The optimizer 520 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 6:
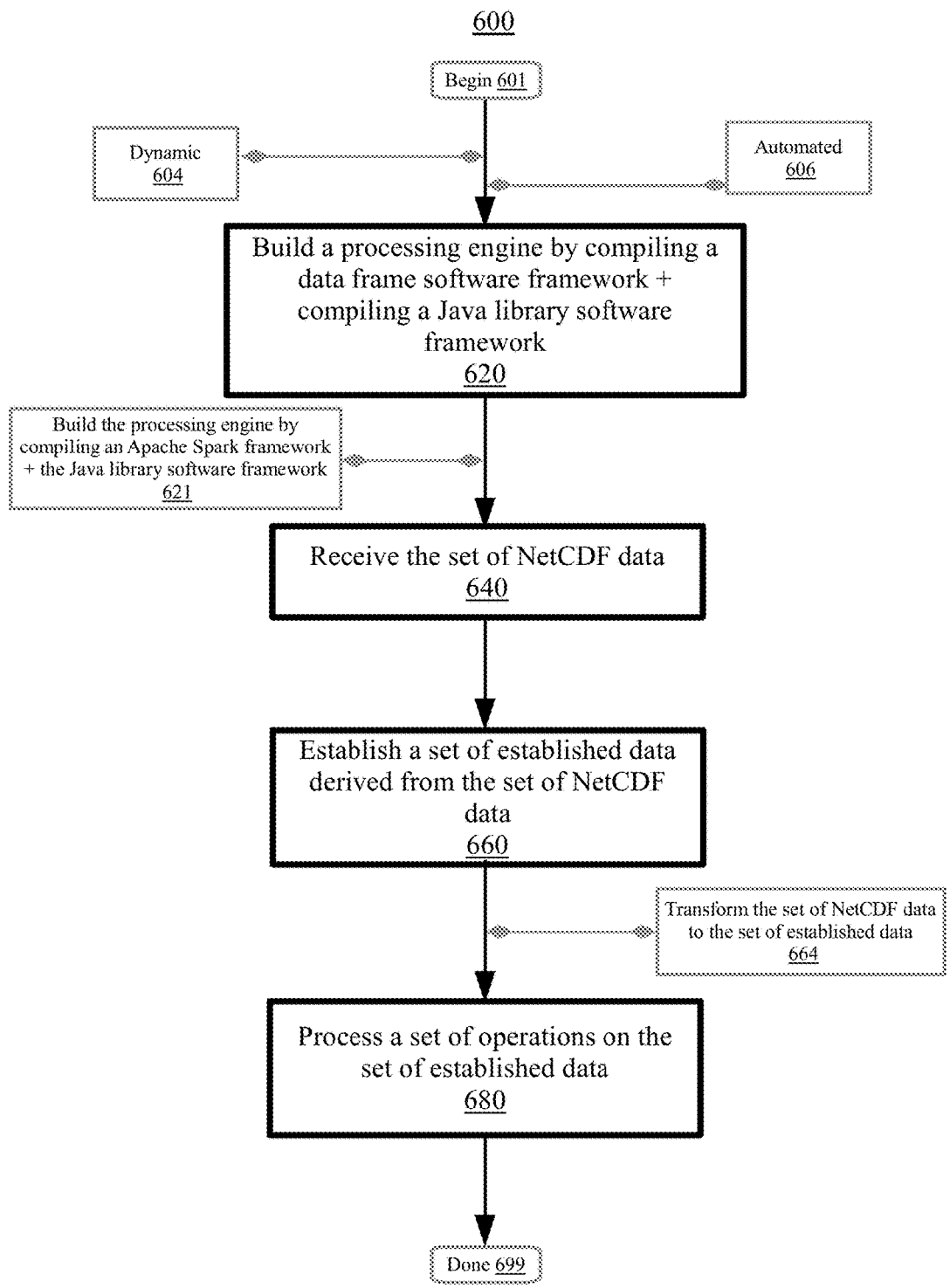
FIG. 6 is a flowchart illustrating a method of Network Common Data Form (NetCDF) data management using a shared pool of configurable computing resources, according to embodiments.

FIG. 6 is a flowchart illustrating a method 600 of NetCDF data management using a shared pool of configurable computing resources. NetCDF data may include a set of software libraries and self-describing, machine-independent data formats. NetCDF may support the creation, access, and sharing of array-oriented scientific data. NetCDF may support a view of data as a collection of self-describing (e.g., describes the layout of the file/data arrays), portable objects that can be accessed through a simple interface. Array values may be accessed directly (e.g., without knowing details of how the data are stored). Application programs may access NetCDF datasets and transform, combine, analyze, or display specified fields of the data. NetCDF data may be portable (e.g., accessible by computers with different ways of storing integers/characters/floating-point numbers), scalable (e.g., a small subset of a large dataset may be accessed efficiently), appendable (e.g., data may be added to a NetCDF file without copying the dataset/redefining the structure), sharable (e.g., one writer and multiple readers may simultaneously access the same file), and archivable (e.g., access to earlier forms of NetCDF data will be supported by current/future versions of the software). As an example, NetCDF data management will be used to read or write a large volume of NetCDF data at scale using a distributed large scale data processing framework. The method 600 may begin at block 601.

In embodiments, the building, the receiving, the establishing, the processing, and the other steps described herein may each be executed in a dynamic fashion at block 604. In such embodiments, the steps described herein are executed in a dynamic fashion to streamline management of the NetCDF data using the shared pool of configurable computing resources. In such embodiments, he set of operational steps occur in real-time, ongoing, or on-the-fly. As an example, one or more operational steps described herein may be carried-out in an ongoing basis to facilitate, promote, or enhance NetCDF data management. Other examples may also be possible.

In embodiments, the building, the receiving, the establishing, the processing, and the other steps described herein may each be executed in an automated fashion at block 606. The steps described herein may be executed in an automated fashion without user intervention. The operational steps may each occur in an automated fashion without user intervention or manual action (e.g., using automated computer machinery, fully machine-driven without manual stimuli). The automated operational steps may be performed by a NetCDF data management engine (e.g., as part of a data management system), a cloud management engine (e.g., as part of a cloud environment), or the like.

At block 620, a processing engine may be built to access a set of NetCDF data. Generally, building can include creating, constructing, or otherwise generating a processing engine. A processing engine may include an electronic circuit which performs operations on an external data source (e.g., memory). The processing engine may be built by compiling a data frame software framework and compiling a Java library software framework. Compiling can include translating, converting, interpreting, adapting, or otherwise generating a data frame software framework and a Java library software framework. A software framework may include a universal, reusable software environment which provides a particular functionality as part of a larger software platform. Software frameworks may include support programs, compilers, code libraries, tool sets, application programming interfaces (APIs), and the like. A data frame software framework may include a computing environment related to a dataset which is organized into named columns. A Java library software framework may include a computing environment related to Java libraries. The Java software may provide a set of its own standard class libraries. The Java class libraries may provide a set of functions to perform tasks (e.g., maintaining lists, parsing). The Java class libraries may provide an abstract interface to tasks that would otherwise depend heavily on the hardware/operating system (e.g., network access, file access). The processing engine may be built using a combination of both the data frame software framework and the Java library software framework in order to process a set of operations. The processing engine may be built with two independent modules or frameworks which form one processing engine. The data frame software framework and the Java library software framework may be combined, merged, or woven together to become one processing engine. The two separate frameworks may be wholly integrated. The two separate frameworks may be combined but left as two separate modules. Certain parts of the two separate frameworks may be integrated while other parts may be left separate. Other methods of combining the two separate frameworks into one processing engine may also be possible.

In embodiments, the processing engine may be built to access the set of NetCDF data at block 621. Generally, building can include creating, constructing, or otherwise generating a processing engine. The processing engine may be built by compiling an Apache Spark/Flink framework and compiling the Java library software framework from a Unidata tool. Compiling can include translating, converting, interpreting, adapting, or otherwise generating. The processing engine may be built by compiling a computing environment related to Apache Spark. Apache Spark may include an open-source cluster-computing framework. Apache Spark may provide an interface for programming entire clusters with implicit data parallelism and fault-tolerance. Apache Spark may provide an application programming interface centered on a data structure called the resilient distributed dataset (RDD). RDD may include a read-only multiset of data items distributed over a cluster of machines. The use of RDDs may facilitate the implementation of both iterative algorithms (e.g., visiting a dataset multiple times in a loop) and interactive data analysis (e.g., repeated database-style querying of data). The processing engine may be built by compiling a computing environment related to the Java library from a Unidata tool. Unidata may include an extended relational data server for embedding in a variety of industry-focused solutions. The processing engine may be built using a combination of both the Apache Spark framework and the Java library software framework from a Unidata tool. The processing engine may be built to form the processing engine as a set of computing objects (e.g., a single computing object, a plurality of computing objects). The combination of Apache Spark and Java library in one processing engine may efficiently and effectively access and analyze the set of NetCDF data.

Consider the following example. NetCDF data management may have applications in climatology. Large volumes of NetCDF data may be stored with respect to climate change data (e.g., glacial mass, sea-level, average temperature, carbon output). The large volume of climate change data may desire the use of multiple computing resources to process the data in a timely fashion. It may be desired to create a processing engine to transform the data to prepare for processing. A processing engine may be built to prepare for processing average sea-level compared to glacial mass (e.g., the NetCDF data) by compiling an Apache Spark framework and a Java library software framework. The processing engine may be used to transform the NetCDF data into a format that can be distributed across a large scale data processing format. Other examples of building a processing engine to access a set of NetCDF data may also be possible.

At block 640, the set of NetCDF data may be received by the processing engine. Generally, receiving can include detecting, collecting, recognizing, acquiring, sensing, or otherwise accepting the set of NetCDF data. The set of NetCDF data may be received from another user/computer. The receiving may occur in an on-going or continuous basis, occur periodically, or may occur in response to an event occurring. The receiving may occur in response to a command or manual action (e.g., a user who is a scientist wants to process the dataset). The receiving may occur automatically (e.g., a certain temporal period has been achieved, an event such as an earthquake occurs).

Consider the following example. NetCDF data management may have applications in meteorology. A national weather outlet may desire to efficiently transform weather data (e.g., temperature, precipitation, wind speed) with a set of computing objects. The processing engine may dynamically receive NetCDF data related to weather (e.g., continuously monitoring temperature of a region). The processing engine may periodically receive NetCDF data (e.g., temperature data received at 12:00 A.M. and 12:00 P.M. daily). The processing engine may receive NetCDF data in response to a command or manual action (e.g., the meteorologist requests/enters a command for the current winds speed). The processing engine may receive NetCDF data automatically in response to an event (e.g., precipitation data received in response to a major snowstorm). Other methods of receiving the set of NetCDF data may also be possible.

At block 660, a set of established data derived from the set of NetCDF data may be established using the processing engine. Generally, establishing can include ingesting, generating, setting-up, or otherwise transforming. The set of established data may include data which is developed from the set of NetCDF data. The set of established data may include data elements derived from NetCDF elements using a mathematical, logical, or other type of transformation (e.g., arithmetic formula, composition, aggregation). The set of established data may be established by storing metadata, arranging a group of dimensions in row-major format, creating an index for a specific dimension set, or organizing a group of variables in column-major format. The set of established data may facilitate the reading and writing of large volumes of data. The set of established data may also allow the user to rely less on code to deploy NetCDF data. The establishing of a set of established data may reformat the dataset or construct a new dataset with the same content in order to process the information more efficiently and quickly.

In embodiments, the set of NetCDF data may be transformed to the set of established data at block 664. Generally, transforming can include altering, converting, reconstructing, or otherwise translating the set of NetCDF data to the set of established data. The transforming may occur using the processing engine. The set of established data may have a tuple-table format. A user application may read or write the NetCDF data using regular tuple-table abstraction of a data frame. In Spark, a data frame may include a distributed collection of data organized into named columns. A tuple-table may include an ordered list of data or elements systemically organized and displayed (e.g., in rows and columns). Tuple-table abstraction may reduce dependency on unnecessary abstractions or concepts. The organization of data in a systemic way (e.g., in a tuple-table) may reduce the processing time of a computing resource. NetCDF data may be more efficiently and quickly located in a tuple-table. Configurability achievable through an Apache Spark data frame may transform relevant parts of data in NetCDF format to tuple-table format based on the needs of an application.

Consider the following example. NetCDF data management may have applications in oceanography. NetCDF data (e.g., endangered species statistics, underwater mapping, coastal study data) may be stored using a shared pool of configurable computing resources. It may be desired to transform this information as efficiently as possible using a single computing object having an Apache Spark framework and an external library software framework (e.g., Java). In order to efficiently process the NetCDF data, the NetCDF data may be transformed into a set of established data with a tuple-table format. As an example, a tuple-table may be created to organize the percentage of healthy coral reefs in regions of Australia over the course of ten years. The different regions of Australia may create the individual rows of the tuple-table while the columns of the tuple-table may consist of each year over the last ten years. Other tuple-tables may be created to organize information pertaining to other oceanography data (e.g., endangered species, sea-level). The organization of established data in tuple-tables may allow for quicker and more efficient processing. Other methods of transforming the set of NetCDF data to the set of established data may also be possible.

At block 680, a set of operations on the set of established data may be processed. Generally, processing can include initiating, enacting, running, or otherwise executing a set of operations on the set of established data. The set of operations may include active processes or functions executed by the processing engine. The set of operations may include various database operations such as a Select operation, an Aggregate operation, a mapping operation, a Join operation, or the like. The processing may occur in a distributed fashion using the shared pool of configurable computing resources and the processing engine. Processing a set of operations on the set of established data may allow large volumes of data to be processed more efficiently. As an example, the original NetCDF data may be organized in such a way that an Aggregate operation would require large amounts of processing time and memory. The use of NetCDF data management using a shared pool of configurable computing resources may transform the NetCDF data to a set of established data. Processing the set of established data with an Aggregate operation may reduce the amount of processing and memory in comparison to processing the set of NetCDF data.

Consider the following example. NetCDF data management may have applications in Geographic Information Systems (GISs). NetCDF data (e.g., historical census data, historical borders/boundaries) may be stored using a shared pool of configurable computing resources. It may be desired to process this data efficiently using a set of computing objects (e.g., combination of Apache Spark/Flink and Java library). A set of operations may be processed on the set of established data derived from the NetCDF data (e.g., census data). As an example, a Select operation may be performed to process only census data from a particular year (e.g., 1912), a particular location (e.g., London, England), a particular age group (e.g., people age 18-30), or the like. Other methods of processing a set of operations on the set of established data may also be possible.

Method 600 concludes at block 699. As described herein, aspects of method 600 relate to NetCDF data management using a shared pool of configurable computing resources. Aspects of method 600 may provide performance or efficiency benefits related to NetCDF data management. Aspects may save resources such as bandwidth, processing, or memory. As an example, building the processing engine by compiling both an Apache Spark framework and the Java library software framework may save processing time. Datasets may be run on multiple computing software instead of only one computing device. The parallel processing may be more efficient and save processing time. Other examples of saving processing time may also be possible.

Figure 7:
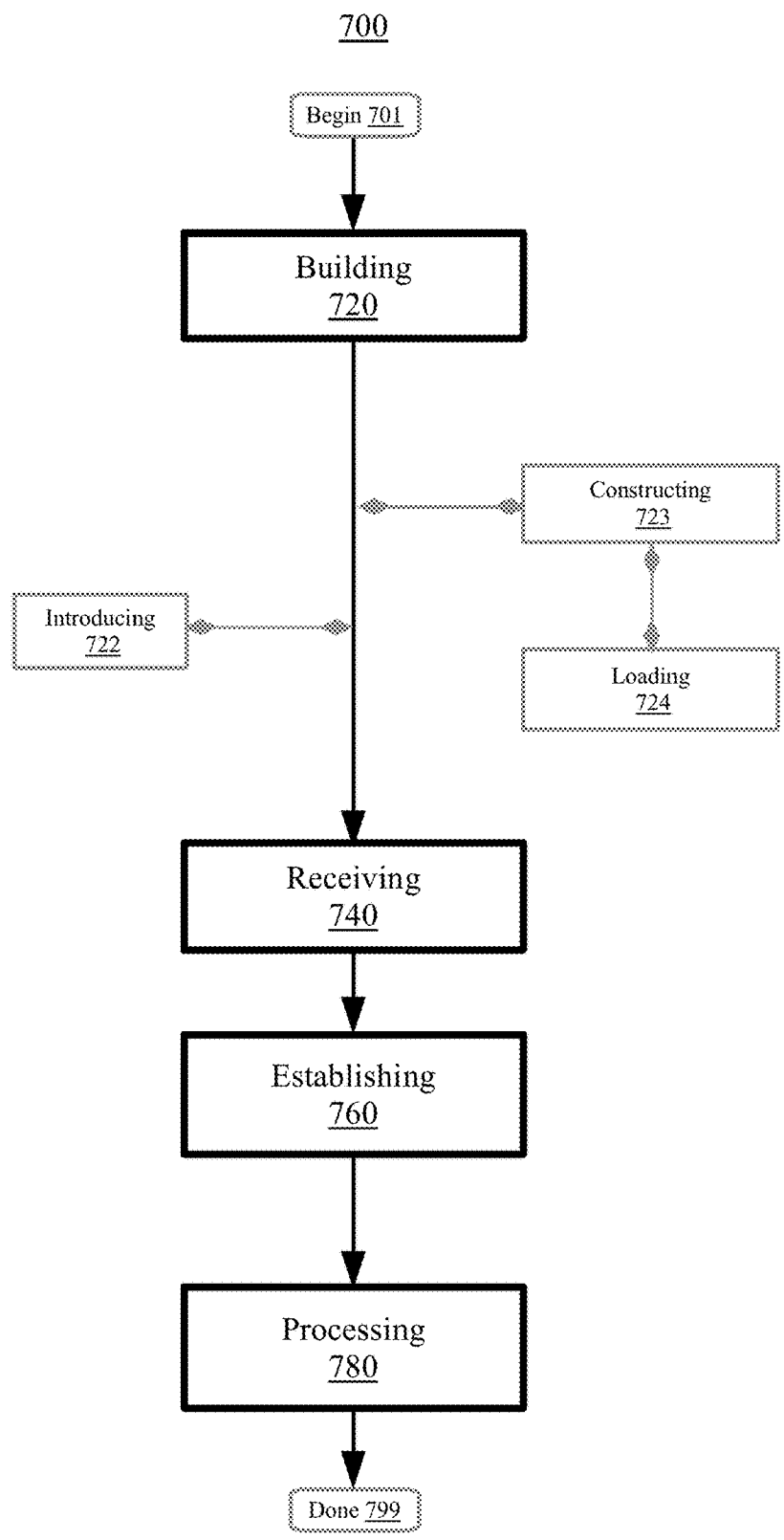
FIG. 7 is a flowchart illustrating a method of NetCDF data management using a shared pool of configurable computing resources, according to embodiments.

FIG. 7 is a flowchart illustrating a method 700 of NetCDF data management using a shared pool of configurable computing resources. Aspects of method 700 may be similar or the same as aspects of method 600, and aspects may be utilized interchangeably with one or more methodologies described herein. The method 700 may begin at block 701. At block 720, a processing engine may be built to access a set of NetCDF data. The processing engine may be built by compiling a data frame software framework and compiling a Java library software framework.

In embodiments, the data frame software framework may be compiled at block 722. Generally, compiling can include translating, converting, interpreting, adapting, or otherwise generating the data frame software framework. The compiling may occur by introducing a set of implementation code. Implementation code may include a realization of a technical specification or algorithm (e.g., a program, software component) through computer programming and deployment. The implementation code may be introduced (e.g., presented, provided) to a data frame reader module and a data frame writer module. In Apache Spark, a data frame reader module may relate to the data or dataset input, or more particularly an API for reading data in standard query language (SQL). A data frame writer module may relate to the data or dataset output, or more particularly, an API for writing out data. The implementation code may be introduced to access the set of NetCDF data. The data frame reader module and data frame writer module may read and/or write NetCDF data. Default data frame reader modules and data frame writer modules may be extended to add one or more methods for reading and writing NetCDF.

Consider the following example. NetCDF data management may have applications in commercial analysis. NetCDF data (e.g., transactions, marketing statistics, market trends) may be stored using a shared pool of configurable computing resources. A data frame software framework may be desired to be compiled in order to efficiently process the large volume of commercial NetCDF data. A new method for the data frame reader and data frame writer modules (or other related interfaces) may be implemented. The new set of implementation code may read and write the NetCDF data. The set of implementation code may read transaction data in SQL in order to access NetCDF data. The set of implementation code may write marketing statistic data in order to access NetCDF data. The data may be read using a syntax similar to:
val netCdfDataFrame=sqlContext.read.netcdf("<file path and name>")
in which the file path and name may indicate a specific component of marketing data. The set of implementation code may compile the data frame software framework to build the single processing engine. In this way, the NetCDF data may be efficiently processed with a single computing object. Other methods of introducing a set of implementation code may also be possible.

In embodiments, the data frame software framework may be compiled at block 723. Generally, compiling can include translating, converting, interpreting, adapting, or otherwise generating the data frame software framework. The compiling may occur by constructing a data frame implementation for NetCDF data. A data frame implementation may include a table or two-dimensional array structure which is constructed (e.g., composed, established) for NetCDF data. The constructing may occur in an external library. The external library may include a collection of resources used by computer programs which is derived from a source other than the computing device. In this case, a separate data frame implementation may be created for the NetCDF data. The separate data frame implementation may be loaded using the data frame reader and data frame writer modules from an external library. An external library (e.g., an extension of Data Frame library of a Spark library) may be efficient for processing data. An external library may store data on other computing devices which may result in a smaller amount of memory or processing time when processing large volumes of data (e.g., NetCDF data).

In embodiments, the data frame software framework may be compiled at block 724. Generally, compiling can include translating, converting, interpreting, adapting, or otherwise generating the data frame software framework. The compiling may occur by loading the data frame implementation for NetCDF data. Loading can include compacting or storing the data frame implementation for NetCDF data. The loading may occur from the external library into the data frame software framework.

Consider the following example. NetCDF data management may have applications in seismology. NetCDF data with respect to earthquakes (e.g., time, location, magnitude) may be continually collected using a shared pool of configurable computing resources. In order to process the large volume of NetCDF data quickly and efficiently, it may be desired to compile a data frame software framework. A separate data frame implementation may be constructed in an external library for the NetCDF data. The data frame implementation may be loaded to an external library using data frame reader and data frame writer modules. The use of this approach may be similar to:
val netCDFDataFrame=sqlContext.read.format("com.apache.spark.netcdf").option("key", "value").load("<file path and name>")
in which the file path and name may relate to an aspect of seismologic data. The construction of a data frame implementation for NetCDF data in an external library may allow the seismology NetCDF data to be processed quickly and efficiently on a set of computing devices consisting of an Apache Spark framework and a Java library software framework. Other methods of constructing a data frame implementation in an external library may also be possible.

At block 740, the set of NetCDF data may be received by the processing engine. At block 760, a set of established data derived from the set of NetCDF data may be established using the processing engine. At block 780, a set of operations on the set of established data may be processed. The processing may occur in a distributed fashion using the shared pool of configurable computing resources and the processing engine. Method 700 concludes at block 799. As described herein, aspects of method 700 relate to NetCDF data management using a shared pool of configurable computing resources. Aspects of method 700 may provide performance or efficiency benefits related to NetCDF data management. Aspects may save resources such as bandwidth, processing, or memory. As an example, constructing a data frame implementation in an external library may save processing time. Through the use of multiple internal and external libraries, parallel processing may occur. The use of multiple libraries for parallel processing may save processing time. Other examples of saving processing time may also be possible.

Figure 8:
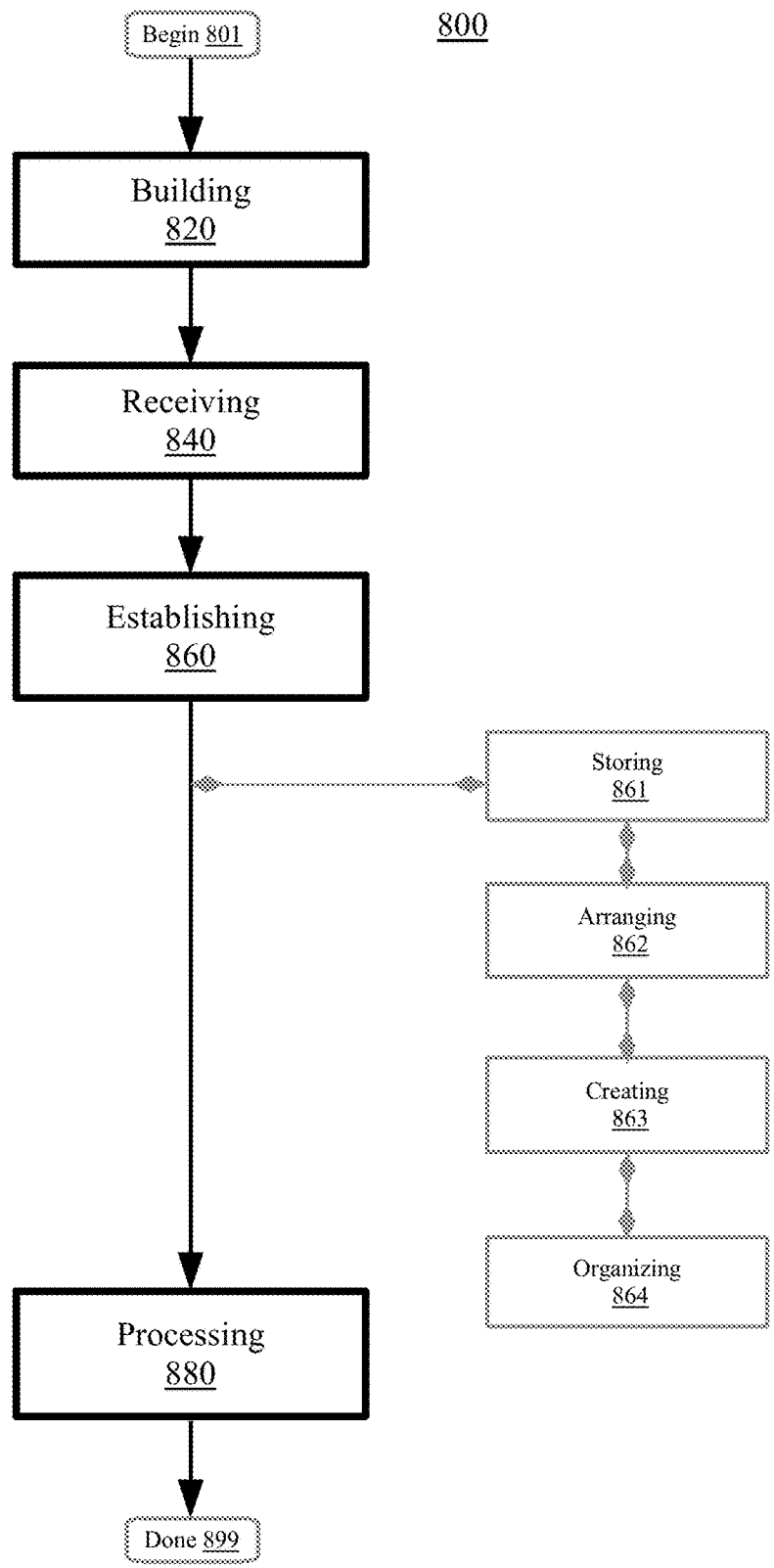
FIG. 8 is a flowchart illustrating a method of NetCDF data management using a shared pool of configurable computing resources, according to embodiments.

FIG. 8 is a flowchart illustrating a method 800 of NetCDF data management using a shared pool of configurable computing resources. Aspects of method 800 may be similar or the same as aspects of method 600/700, and aspects may be utilized interchangeably with one or more methodologies described herein. The method 800 may begin at block 801. At block 820, a processing engine may be built to access a set of NetCDF data. The processing engine may be built by compiling a data frame software framework and compiling a Java library software framework. At block 840, the set of NetCDF data may be received by the processing engine. At block 860, a set of established data derived from the set of NetCDF data may be established using the processing engine.

In embodiments, the set of established data derived from the set of NetCDF data may be established at block 861. Generally, establishing can include ingesting, generating, setting-up, or otherwise transforming a set of established data derived from the set of NetCDF data. The establishing may occur using the processing engine. The establishing may occur by storing metadata. Generally, storing can include collecting, accumulating or saving metadata. The metadata information may specify a number of dimensions, unique dimension sets, and variables. The metadata may indicate a dimension quantity. Dimensions may be used to define the shape of data in NetCDF. A NetCDF dimension may include a length (e.g., a positive integer) of the data in the dataset. The metadata may indicate a unique dimension set quantity. A NetCDF dimension set may include a group of length quantities (e.g., positive integers) of the data in the dataset. The metadata may indicate a variable quantity. Variables may be used to store the bulk of the data in a NetCDF dataset. A variable may represent an array of values of the same type.

Consider the following example. The set of NetCDF data may include wind speed and wind direction statistics of a specific location (which is being collected continually). In order to process the large volume of NetCDF data, the set of established data may be established based on metadata. The metadata may include a dimension quantity (e.g., a positive integer such as 500), a dimension set quantity (e.g., dimensions with a quantity of 310), and a variable quantity (e.g., three different variables). The metadata may be used to establish the set of established data, which may be processed via a combination of Apache Spark and Java library. Other methods of storing metadata to establish the set of established data may also be possible.

In embodiments, the set of established data derived from the set of NetCDF data may be established at block 862. The establishing may occur using the processing engine as described herein. The establishing may occur by arranging a group of dimensions in a row-major format to have a group of in-sequence individual (e.g., unique) dimension sets. Generally, arranging can include ordering, assembling, displaying, or otherwise organizing the group of dimensions in a row-major format. Row-major format may include a method for arranging multidimensional arrays in linear storage (e.g., random access memory) which organizes the dimensions based on consecutive elements of the rows of the array. Unique combinations or sets (e.g., dimension sets) of various values of dimensions may be put in a sequence.

Consider the following example. The set of NetCDF data may include water level and velocity data to be used by civil engineers for a dam study. In order to process the large volume of NetCDF data, the set of established data may be established by arranging a group of dimensions in a row-major format. The variables and statistics may be arranged or divided in a row-major format based on similar dimensions, dimension sets, and the like. As an example, the data pertaining to water level over time at a particular spot in a particular stream may be arranged in one row. The data pertaining to water level over time at a different spot in the same stream may be arranged in another row. The data pertaining to water level over time at a different stream may be arranged in yet another row. Organizing the established data in a row-major format may allow for more efficient processing of large volumes of data. Instead of searching and processing the entire dataset, the processing engine can search for a specific row. Other methods of arranging a group of dimensions in a row-major format may also occur.

In embodiments, the set of established data derived from the set of NetCDF data may be established at block 863. The establishing may occur using the processing engine as described herein. The establishing may occur by creating an index for a specific dimension set of the group of in-sequence individual dimension sets. An index may include a list or record of dimension sets with references to the places where they occur to quickly retrieve specific dimension sets. As an example, an index may be created to organize NetCDF data pertaining to atmospheric carbon levels over time for a climatology study. The index may be organized based on the day, the month, the year, or the level of carbon. The organization of NetCDF data into an index may create a set of established data, which may be more efficiently processed in large volumes by a combination of Apache Spark and Java library. Instead of searching and processing the entire dataset, the processing engine may search for a specific day, year, or carbon level. In this way, the large volume of climatology data may be more efficiently processed. Other examples of creating an index for a specific dimension set may also be possible.

In embodiments, the set of established data derived form the set of NetCDF data may be established at block 864. The establishing may occur using the processing engine as described herein. The establishing may occur by organizing a group of variables in a column-major format to have a group of in-sequence variable values. Generally, arranging can include ordering, assembling, sorting, presenting, or otherwise organizing the group of dimensions in a column-major format. Column-major format may include a method for arranging multidimensional arrays in linear storage (e.g., random access memory) which organizes the dimensions based on consecutive elements of the columns of the array. The variables may be arranged in column-major format. Values of a variable which correspond to the unique dimension sets may be arranged in a sequence. If multiple variables are selected, then a similar sequence may be repeated for the multiple variables. The in-sequence variable values may correspond to the group of in-sequence individual dimension sets. The index value specific to a dimension may be the same as the position index of the corresponding value of a variable in the column-major sequence of the variable.

Consider the following example. A group of variables related to a large volume of oceanography NetCDF data may be desired to be processed efficiently. A group of variables may be arranged in a column-major format based on in-sequence variable values. As an example, the NetCDF data may include sea-level during specific seasons over time (e.g., in years) in various locations around the planet. These variables (e.g., season, year, location, sea-level) may be organized in a column-major format for more efficient processing. One column may include the sea-level in winter. Another column may include the sea-level around Antarctica. Other columns may also be created to organize the data. In this way, the set of established data may be established for efficient processing. Instead of searching and processing the entire dataset, the processing engine can search for a specific column. Other methods of organizing a group of variables in a column-major format may also be possible.

At block 880, a set of operations on the set of established data may be processed. The processing may occur in a distributed fashion using the shared pool of configurable computing resources and the processing engine. Method 800 concludes at block 899. As described herein, aspects of method 800 relate to NetCDF data management using a shared pool of configurable computing resources. Aspects of method 800 may provide performance or efficiency benefits related to NetCDF data management. Aspects may save resources such as bandwidth, processing, or memory. As an example, memory may be saved by creating an index for a specific dimension set. The creation of an index may allow the processing engine to more easily and efficiently search the dataset. The processing engine can search for a specific dimension, dimension set, or variable quantity instead of searching the entire dataset. This may allow large volumes of data to be processed without utilization of a large amount of memory. Other methods of saving memory may also be possible.

Figure 9:
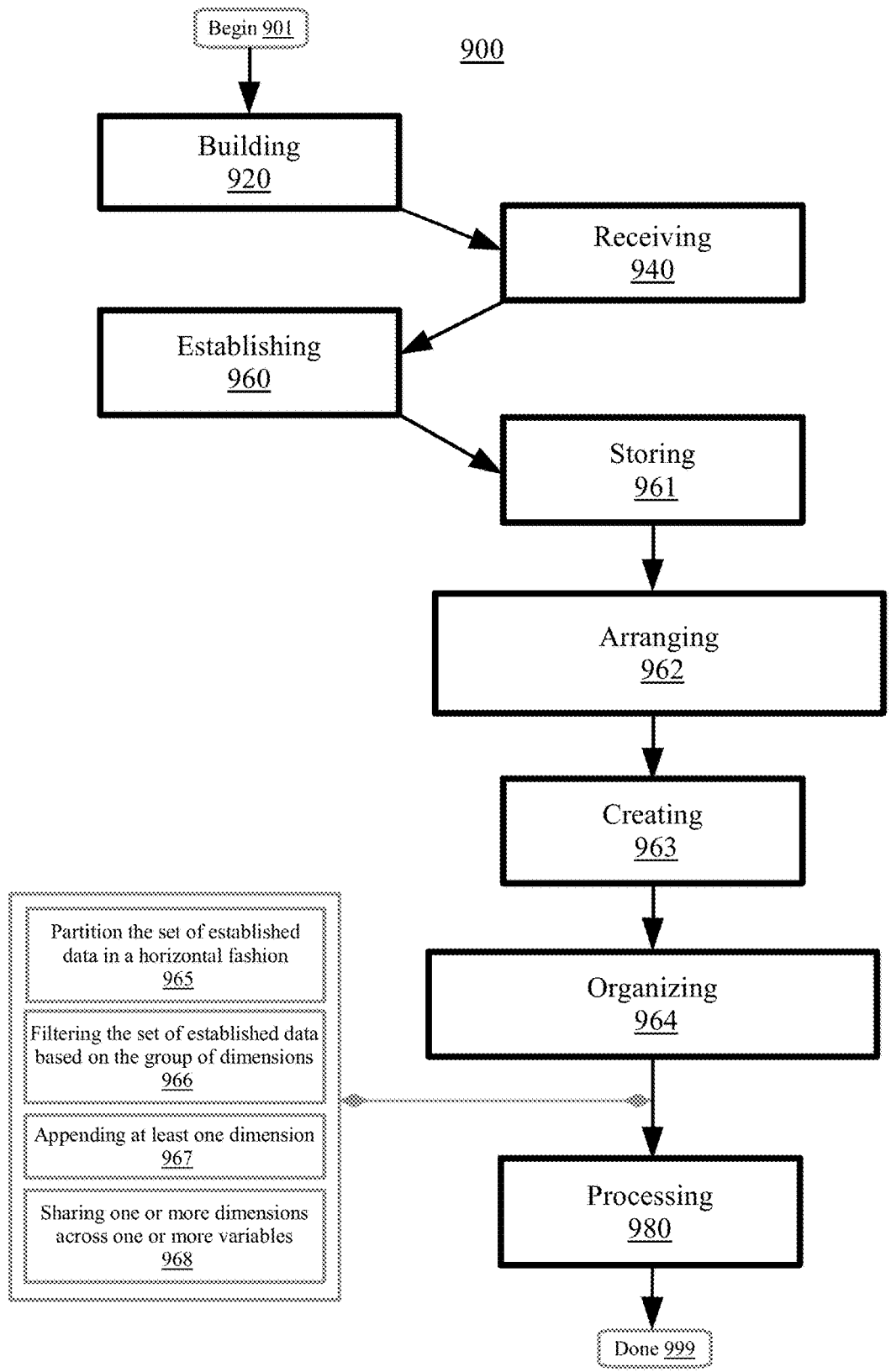
FIG. 9 is a flowchart illustrating a method of NetCDF data management using a shared pool of configurable computing resources, according to embodiments.

FIG. 9 is a flowchart illustrating a method 900 of NetCDF data management using a shared pool of configurable computing resources. Aspects of method 900 may be similar or the same as aspects of method 600/700/800, and aspects may be utilized interchangeably with one or more methodologies described herein. The method 900 may begin at block 901. At block 920, a processing engine may be built to access a set of NetCDF data. The processing engine may be built by compiling a data frame software framework and compiling a Java library software framework. At block 940, the set of NetCDF data may be received by the processing engine. At block 960, a set of established data derived from the set of NetCDF data may be established using the processing engine. At block 961, the set of established data derived from the set of NetCDF data may be established. The establishing may occur using the processing engine. The establishing may occur by storing metadata. The metadata may indicate a dimension quantity, a unique dimension set quantity, and a variable quantity. At block 962, the set of established data derived from the set of NetCDF data may be established. The establishing may occur using the processing engine. The establishing may occur by arranging a group of dimensions in a row-major format to have a group of in-sequence individual dimension sets. At block 963, the set of established data derived from the set of NetCDF data may be established. The establishing may occur using the processing engine. The establishing may occur by creating an index for a specific dimension set of the group of in-sequence individual dimension sets. At block 964, the set of established data derived form the set of NetCDF data may be established. The establishing may occur using the processing engine. The establishing may occur by organizing a group of variables in a column-major format to have a group of in-sequence variable values. The in-sequence variable values may correspond to the group of in-sequence individual dimension sets.

In embodiments, an operation may be performed. Generally, performing can include processing, carrying-out, initiating, launching, implementing, enacting, or otherwise executing an operation. In such embodiments, the operation includes partitioning the set of established data in a horizontal fashion at block 965. Partitioning can include dividing, separating, or otherwise organizing the set of established data in a horizontal fashion (e.g., related to row-major format). The partitioning may occur based on the group of dimensions. Similar components of dimensions may result in the dimensions being grouped together. The row-major format for the dimensions may facilitate the partitioning of the datasets horizontally with respect to the values of various dimensions.

In embodiments, the operation may include filtering the set of established data at block 966. Generally, filtering can include including, excluding, extracting, or otherwise sorting the set of established data. The filtering may occur based on the group of dimensions. Similar components of dimensions may result in the dimensions being included or excluded from the set of established data. The row-major format for the dimensions may facilitate the implementation of filter operations based on selected values of dimensions. The positions of the values of variables may be linked to the index of the dimension set which may facilitate filtering based on certain values of variables.

In embodiments, the operation may include appending at least one dimension at block 967. Generally, appending can include adding, attaching, extending, or otherwise affixing at least one dimension. The appending may occur using a separate loading process without otherwise modifying the set of established data. The appending may occur separate from the set of established data to prevent changes to the set of established data. Row-major format for the dimensions may support appendable dimensions since the additional data may be loaded in a separate process without making changes to the existing data.

In embodiments, the operation may include sharing one or more dimensions across one or more variables at block 968. Generally, sharing can include distributing, dispersing, or otherwise allocating one or more dimensions across one or more variables. The sharing may occur using the index. The organization of variables or dimensions in the index may facilitate the sharing due to a reduced searching and processing time. Row-major format for the dimensions may facilitate sharing dimensions across variables using the index.

Consider the following example. A set of established data may be created based on NetCDF data pertaining to glacial mass in Antarctica for a climatology study. The set of established data (e.g., glacial mass, sea-level, number of polar bears living on Antarctica) may be partitioned in a horizontal fashion based on the group of dimensions. One row may relate to each of the different variables (e.g., Row 1 for glacial mass, Row 2 for sea-level, Row 3 for polar bear population). The set of established data may be filtered based on the group of dimensions. As an example, Rows 1 and 2 may be included while Row 3 may be excluded. At least one dimension may be appended. In this case, another row (e.g., Row 4 with information about average temperature) may be included instead. The dimensions (e.g., Row 1, Row 2, and Row 4) may be shared using the index. The index, as well as the horizontal partitions, may allow for a faster and more efficient search by the processing engine. Other examples of using row-major format to process the set of established data may also be possible.

At block 980, a set of operations on the set of established data may be processed. The processing may occur in a distributed fashion using the shared pool of configurable computing resources and the processing engine. Method 900 concludes at block 999. As described herein, aspects of method 900 relate to NetCDF data management using a shared pool of configurable computing resources. Aspects of method 900 may provide performance or efficiency benefits related to NetCDF data management. Aspects may save resources such as bandwidth, processing, or memory. As an example, partitioning the set of established data horizontally may save processing time. Partitioning the established data into clusters may reduce the amount of processing time used searching for a specific cluster or clusters. Other examples of reducing processing time may also be possible.

Figure 10:
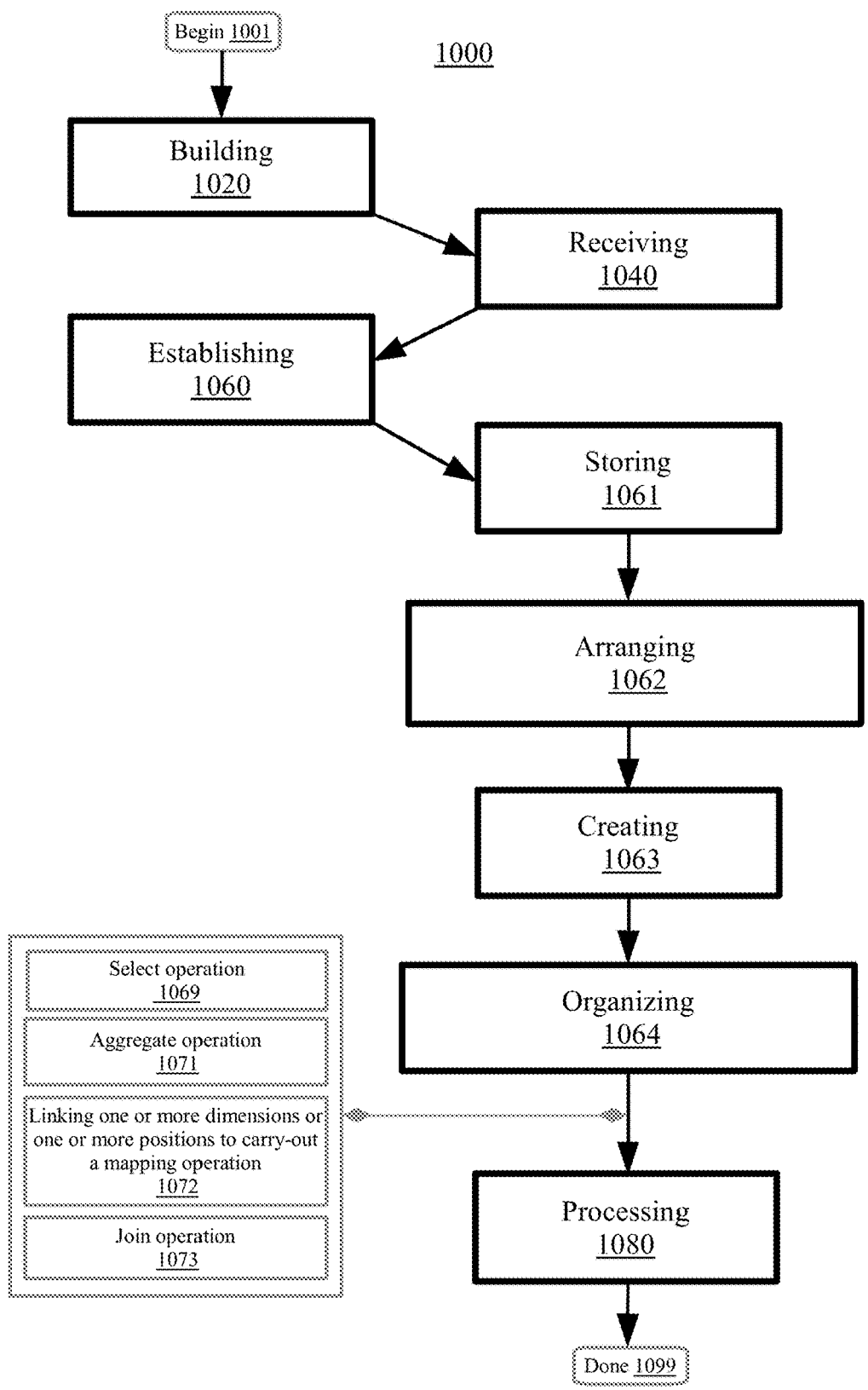
FIG. 10 is a flowchart illustrating a method of NetCDF data management using a shared pool of configurable computing resources, according to embodiments.

FIG. 10 is a flowchart illustrating a method 1000 of NetCDF data management using a shared pool of configurable computing resources. Aspects of method 1000 may be similar or the same as aspects of other methods described herein, and aspects may be utilized interchangeably with one or more methodologies described herein. The method 1000 may begin at block 1001. At block 1020, a processing engine may be built to access a set of NetCDF data. The processing engine may be built by compiling a data frame software framework and compiling a Java library software framework. At block 1040, the set of NetCDF data may be received by the processing engine. At block 1060, a set of established data derived from the set of NetCDF data may be established using the processing engine. At block 1061, the set of established data derived from the set of NetCDF data may be established. The establishing may occur using the processing engine. The establishing may occur by storing metadata. The metadata may indicate a dimension quantity, a unique dimension set quantity, and a variable quantity. At block 1062, the set of established data derived from the set of NetCDF data may be established. The establishing may occur using the processing engine. The establishing may occur by arranging a group of dimensions in a row-major format to have a group of in-sequence individual dimension sets. At block 1063, the set of established data derived from the set of NetCDF data may be established. The establishing may occur using the processing engine. The establishing may occur by creating an index for a specific dimension set of the group of in-sequence individual dimension sets. At block 1064, the set of established data derived from the set of NetCDF data may be established. The establishing may occur using the processing engine. The establishing may occur by organizing a group of variables in a column-major format to have a group of in-sequence variable values. The in-sequence variable values may correspond to the group of in-sequence individual dimension sets.

In embodiments, an operation may be performed. The operation may include carrying-out a Select operation at block 1069. Generally, carrying-out can include processing, performing, initiating, launching, enacting, or otherwise executing a Select operation. The Select operation may be used to choose elements from a table or relation. Specifically, the operation may be related to the column-major format. The Select operation may choose columns from a table or relation based on one or more specific variables. The column-major format of the variables may facilitate the implementation of the Select operation with respect to specific variables.

In embodiments, the operation may include carrying-out an Aggregate operation at block 1071. Generally, carrying-out can include processing, performing, initiating, launching, enacting, or otherwise executing an Aggregate operation. The Aggregate operation may be performed on a data structure (e.g., an array, a column) as whole rather than an individual element. A Group By statement may be used in conjunction with the Aggregate functions to group the result-set by one or more columns. The Aggregate operation may perform operations on an entire column or groups of columns (as opposed to an individual element of a column) based on one or more specific variables. The column-major format of the variables may facilitate implementation of Aggregate or Group By operations.

In embodiments, the operation may include linking the one or more dimensions and one or more positions of the one or more specific variables at block 1072. Generally, linking can include connecting, combining, coupling, or otherwise joining the one or more dimensions and one or more positions of the one or more specific variables. The linking may occur using the index. The linking may occur to subsequently carry-out a mapping operation. A mapping operation may include creating data element transformations between two distinct data sets. The column-major format of the variables may facilitate implementation of other operations (e.g., Mapp, flatMap) as the dimension sets are linked to the position of the variables through the index of a dimension set.

In embodiments, the operation may include carrying-out a Join operation at block 1073. Generally, carrying-out can include processing, performing, initiating, launching, enacting, or otherwise executing a Join operation. The Join operation may combine columns from one or more tables in a relational database. The Join operation may create a set which can be saved as a table or used as is. The Join operation may include adding the one or more specific variables. The Join operation may combine columns by using values common to each column. The column-major format of the variables may facilitate implementation of join operations where variables can be easily added.

Consider the following example. A set of established data may be created based on a set of NetCDF data pertaining to the depth at various locations in the Atlantic Ocean (e.g., depth, salinity, number of species). A column-major format may be used to organize the NetCDF data into a set of established data to allow for more efficient processing. A Select operation may be carried-out based on one or more specific variables. As an example, a user may enter a command to Select salinity data at a certain coordinate point. An Aggregate operation may be carried-out, such as a grouping of the data pertaining to depth at all coordinates in a specific trench in the Atlantic Ocean. One or more dimensions may be linked to carry-out a mapping operation. As an example, the salinity level may be mapped to the depth using the index (e.g., data will be indexed by both the salinity level and the location of the salinity level). A Join operation may be carried-out. As an example, Column 1 (e.g., depth) and Column 2 (e.g., population of marine life) may be joined to parallel-process those two columns. Other methods of using column-major format to process the set of established data may also be possible.

At block 1080, a set of operations on the set of established data may be processed. The processing may occur in a distributed fashion using the shared pool of configurable computing resources and the processing engine. Method 1000 concludes at block 1099. As described herein, aspects of method 1000 relate to NetCDF data management using a shared pool of configurable computing resources. Aspects of method 1000 may provide performance or efficiency benefits related to NetCDF data management. Aspects may save resources such as bandwidth, processing, or memory. As an example, processing time may be saved by carrying-out an Aggregate operation. The Aggregate operation may group together specific variables or columns of a data set which may facilitate processing. The use of similar groups as well as an index may reduce the searching or processing time to locate a specific column or columns. Other examples of saving processing time may also be possible.

Figure 11:
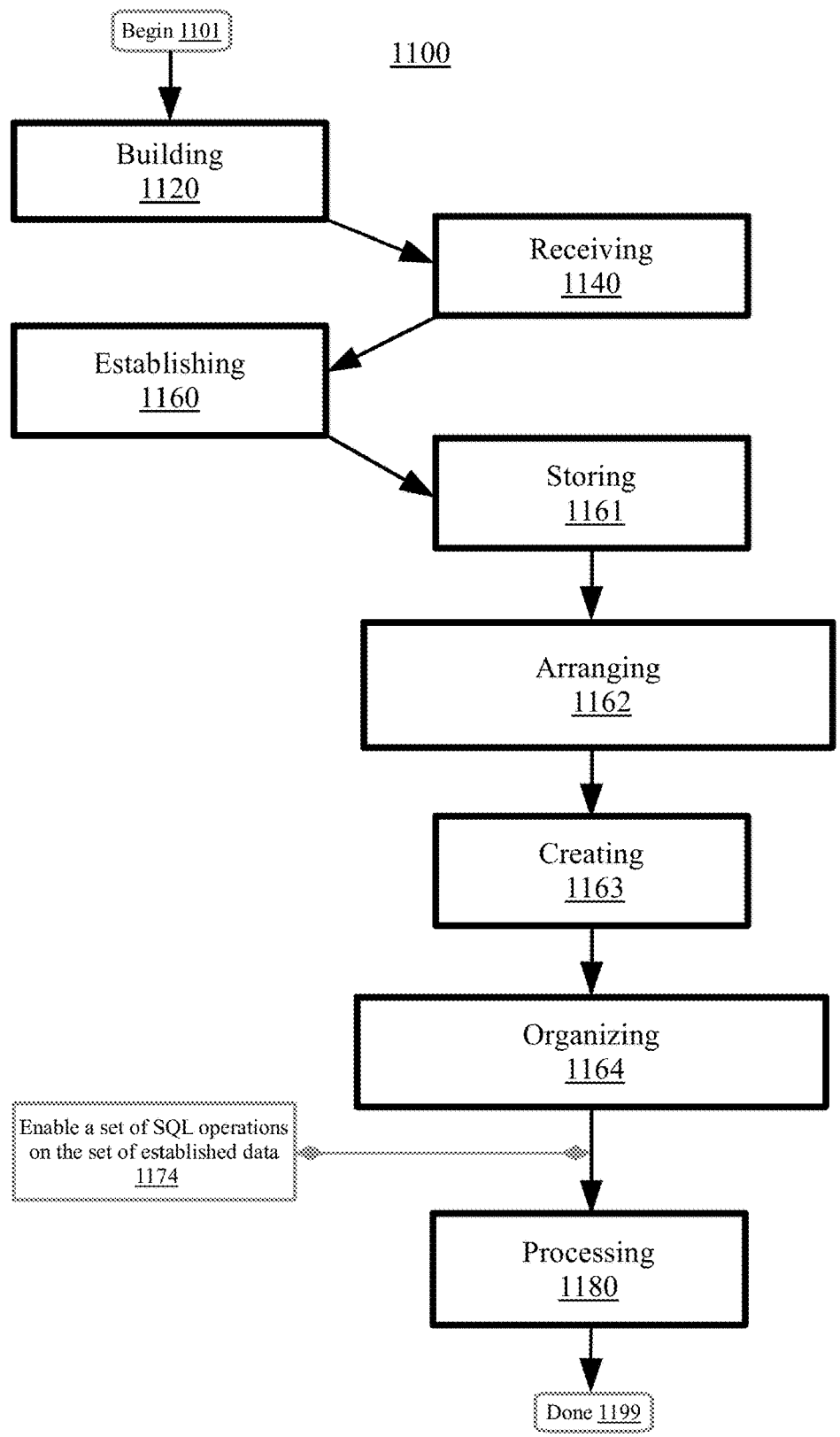
FIG. 11 is a flowchart illustrating a method of NetCDF data management using a shared pool of configurable computing resources, according to embodiments.

FIG. 11 is a flowchart illustrating a method 1100 of NetCDF data management using a shared pool of configurable computing resources. Aspects of method 1100 may be similar or the same as aspects of other methods described herein, and aspects may be utilized interchangeably with one or more methodologies described herein. The method 1100 may begin at block 1101. At block 1120, a processing engine may be built to access a set of NetCDF data. The processing engine may be built by compiling a data frame software framework and compiling a Java library software framework. At block 1140, the set of NetCDF data may be received by the processing engine. At block 1160, a set of established data derived from the set of NetCDF data may be established using the processing engine. At block 1161, the set of established data derived from the set of NetCDF data may be established. The establishing may occur using the processing engine. The establishing may occur by storing metadata. The metadata may indicate a dimension quantity, a unique dimension set quantity, and a variable quantity. At block 1162, the set of established data derived from the set of NetCDF data may be established. The establishing may occur using the processing engine. The establishing may occur by arranging a group of dimensions in a row-major format to have a group of in-sequence individual dimension sets. At block 1163, the set of established data derived from the set of NetCDF data may be established. The establishing may occur using the processing engine. The establishing may occur by creating an index for a specific dimension set of the group of in-sequence individual dimension sets. At block 1164, the set of established data derived form the set of NetCDF data may be established. The establishing may occur using the processing engine. The establishing may occur by organizing a group of variables in a column-major format to have a group of in-sequence variable values. The in-sequence variable values may correspond to the group of in-sequence individual dimension sets.

In embodiments, a set of Structured Query Language (SQL) operations may be enabled at block 1174. Generally, enabling can include authorizing, expediting, or otherwise facilitating a set of SQL operations. SQL may relate to a domain-specific language used in programming and designed for managing data held in a relational database management system or for stream processing in a relational data stream management system. SQL may consist of data definition language, data manipulation language, and data control language. The set of SQL operations may be enabled on the set of established data. Organizing data sets by keeping dimensions and variables together may facilitate implementation of table-like abstraction to enable SQL operations through a custom adapter (e.g., through the use of Encoder abstraction in Spark). As an example, the set of established data may relate to borders and boundaries of different countries over time. A set of SQL operations may be enabled to process the set of data. As an example, a user may input a query to CREATE TABLE. The set of established data (e.g., total area, countries, time) may store variables based on the SQL operation entered by the user. Other examples of enabling SQL operations on the set of established data may also occur.

At block 1180, a set of operations on the set of established data may be processed. The processing may occur in a distributed fashion using the shared pool of configurable computing resources and the processing engine. Method 1100 concludes at block 1199. As described herein, aspects of method 1100 relate to NetCDF data management using a shared pool of configurable computing resources. Aspects of method 1100 may provide performance or efficiency benefits related to NetCDF data management. Aspects may save resources such as bandwidth, processing, or memory. As an example, processing time may be saved by grouping data sets with respect to both dimensions and variables and storing the information in an index. The data in the data set may require less searching and processing time when an SQL command is entered to find specific data. Other examples of saving processing time may also be possible.

Figure 12:
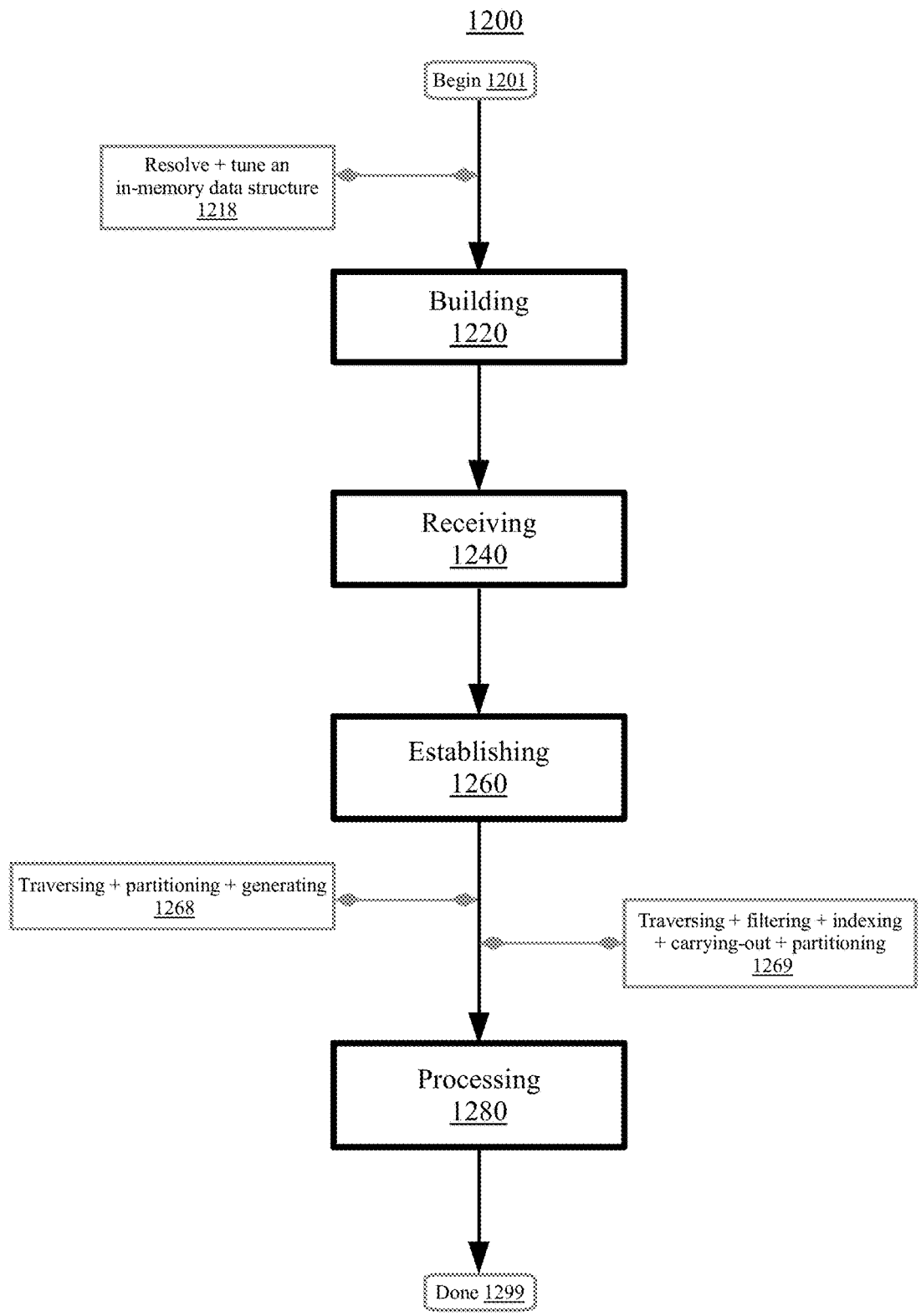
FIG. 12 is a flowchart illustrating a method of NetCDF data management using a shared pool of configurable computing resources, according to embodiments.

FIG. 12 is a flowchart illustrating a method 1200 of NetCDF data management using a shared pool of configurable computing resources. Aspects of method 1200 may be similar or the same as aspects of other methods described herein, and aspects may be utilized interchangeably with one or more methodologies described herein. The method 1200 may begin at block 1201.

In embodiments, resolving and tuning may occur at block 1218. An in-memory data structure may be resolved. Generally, resolving can include determining, constructing, enabling, or otherwise acquiring an in-memory data structure. An in-memory data structure may include features or configurations which (primarily) rely on main memory of computer data storage. The resolving may occur to access the set of NetCDF data. The in-memory data structure may be tuned to access the set of NetCDF data. Generally, tuning can include configuring, arranging, or otherwise organizing the in-memory data structure to access the set of NetCDF data. The tuning may occur to a processing architecture of a parallel computing framework of Apache Spark. A parallel computing framework may include a type of computation in which many calculations or the execution of processes are carried-out simultaneously. Large problems may be divided into smaller ones (e.g., bit-level, instruction-level, data, task parallelism) which can then be solved at the same time (e.g., ongoing, in real-time). As an example, an in-memory data structure may be resolved to access NetCDF data pertaining to carbon output by different international corporations over time. The NetCDF data may be stored primarily in the main memory of a computing device. The in-memory data structure may be configured to be implemented with a parallel computing framework of Apache Spark. In this way, different operations may be processed simultaneously. As an example, a Search operation for a specific country may be carried-out at the same time as a separate Search operation for a specific corporation. Other examples of using an in-memory data structure to access the set of NetCDF data may also be possible.

At block 1220, a processing engine may be built to access a set of NetCDF data. The processing engine may be built by compiling a data frame software framework and compiling a Java library software framework. At block 1240, the set of NetCDF data may be received by the processing engine. At block 1260, a set of established data derived from the set of NetCDF data may be established using the processing engine.

In embodiments, traversing, partitioning, and generating may occur at block 1268. A set of variable-length offsets may be traversed. Generally, traversing can include navigating, crossing, or otherwise passing a set of variable-length offsets. The traversing may occur using a hybrid columnar technique to store data in memory. A hybrid columnar technique may include a process during which the data is written out in rows of a fixed length and read out one column at a time. The traversing may occur to locate a variable value related to a particular dimension of a group of dimensions. The set of established data may be partitioned. Generally, partitioning can include dividing, separating, or otherwise organizing the set of established data. The partitioning may occur based on one or more variables. The partitioning may occur to scale the established data to facilitate throughput. A cluster of data chunks may be generated. Generally, generating can include producing, constructing, determining, or otherwise providing a cluster of data chunks. The generating may occur utilizing the hybrid columnar technique. The generating may occur to process a set of bounded operations. Using the hybrid columnar approach of storing data in memory, a variable value may be located related to a dimension of a dimension set in constant time (e.g., by traversing the variable-length offsets). Partitions based on dimensions, variables, or both may be supported depending on the need of the application. Appropriate data chunks may be created based on dimensions, variables, or both depending on the need of the application.

Consider the following example. NetCDF data management may be used to collect and manage data related to precipitation level at different elevations in different states. The different variables (e.g., precipitation amount, elevation level, state) may be traversed using a hybrid columnar technique. The set of established data may be split into clusters based on one or more variables. As an example, Cluster 1 may consist of precipitation level at sea-level in Florida. Cluster 2 may consist of precipitation level at an elevation of over 200 feet in California. Cluster 3 may consist of precipitation level at all elevations in Rhode Island. The cluster of data chunks may be generated to process the data. The processing engine may more efficiently search for a particular dataset based on the clusters. Instead of clustering based on only columns or only rows, clustering based on columns and rows may allow the processing engine to more specifically search for relevant data. Other methods of using a hybrid columnar technique may also be possible.

In embodiments, traversing, filtering, indexing, carrying-out, and partitioning may occur at block 1269. A set of variable-length offsets may be traversed. Generally, traversing can include navigating, crossing, or otherwise passing a set of variable-length offsets as described herein. The traversing may occur using a hybrid columnar technique to store data in memory. The traversing may occur to locate a variable value related to a particular dimension of a group of dimensions. The set of established data may be filtered. Filtering may include including, excluding, or otherwise sorting the set of established data. The filtering may occur utilizing the hybrid columnar technique. The set of established data may be indexed. Generally, indexing can include sorting, arranging, or otherwise listing the set of established data. The indexing may occur using the processing engine. The indexing may occur when establishing the set of established data. A Join operation may be carried-out. Generally, carrying-out can include performing, processing, launching, implementing or otherwise executing a Join operation. The Join operation may combine columns from one or more tables in a relational database as described herein. The carrying-out may occur utilizing the hybrid columnar technique. The set of established data may be partitioned. Generally, partitioning can include dividing, separating, or otherwise organizing the set of established data. The partitioning may occur based on one or more variables. The partitioning may occur to scale the established data to facilitate throughput.

Consider the following example. NetCDF data management may be used to collect and manage data related to oceanography. The different variables (e.g., depth, location, pollution level) may be traversed using a hybrid columnar technique. The set of established data may be clustered based on one or more variables (e.g., a cluster based on the deepest parts of the Atlantic Ocean, a cluster based on the most polluted parts of the Pacific Ocean, a cluster based on shallow and polluted waters). The set of established data may be filtered utilizing the hybrid columnar technique and indexed using the processing engine. In this way, relevant data may be quickly and efficiently located by the processing engine. Instead of searching the entire dataset, the processing engine may only search relevant or specific clusters. Other examples of using a hybrid columnar technique may also occur.

At block 1280, a set of operations on the set of established data may be processed. The processing may occur in a distributed fashion using the shared pool of configurable computing resources and the processing engine. Method 1200 concludes at block 1299. As described herein, aspects of method 1200 relate to NetCDF data management using a shared pool of configurable computing resources. Aspects of method 1200 may provide performance or efficiency benefits related to NetCDF data management. Aspects may save resources such as bandwidth, processing, or memory. As an example, the use of a hybrid columnar technique to generate a cluster of data chunks may save processing time. The set of established data may be organized into both column-major format and row-major format. In this way, data may be more easily and efficiently located by the processing engine. Instead of searching the entire dataset, the processing engine may only search certain specific and relevant clusters of data. This may result in a shorter processing time. Other examples of saving processing time may also be possible.

Figure 13:
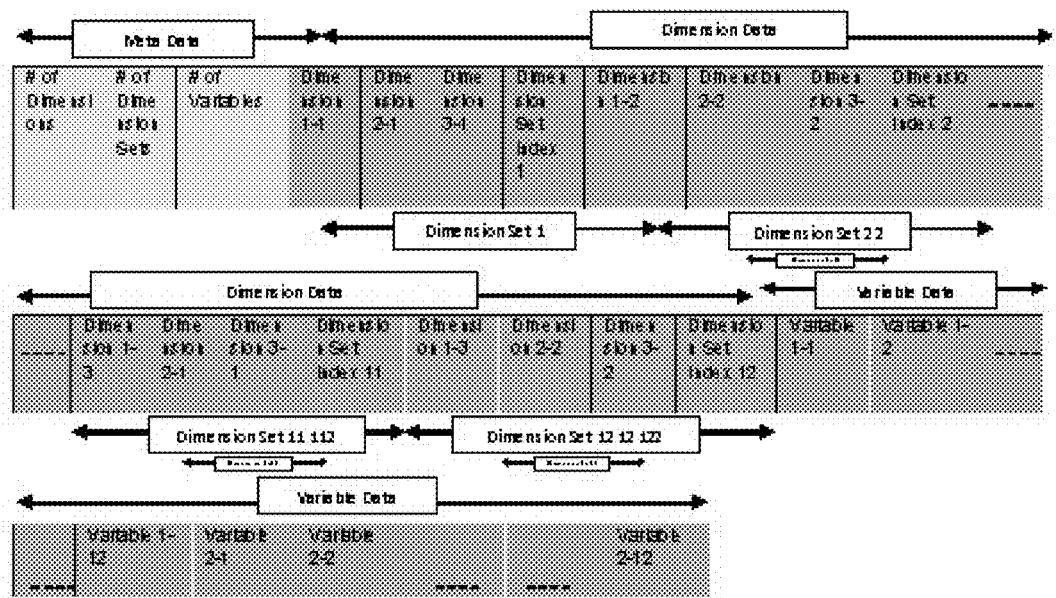
FIG. 13 shows an example system for NetCDF data management using a shared pool of configurable computing resources, according to embodiments.

FIG. 13 illustrates an example system 1300 for NetCDF data management using a shared pool of configurable computing resources, according to embodiments. Consider the following example. NetCDF data management may have applications in a climatology study related to global warming. Large volumes of NetCDF data may be stored related to average temperatures, average sea-level, average atmospheric carbon percentage, average carbon output by various countries/corporations, glacial mass, and the like. There may be a desire to transform the large volume of NetCDF data for efficient processing. A processing engine may be built by compiling an Apache Spark framework and a Java library software framework from a Unidata tool. In one approach, a new method for a data frame reader module and a data frame writer module may be implemented to access the set of NetCDF data. In another approach, a separate data frame implementation may be created and loaded using the data frame reader and data frame writer modules from an external library.

The set of NetCDF data may be received by the processing engine and a set of established data may be derived from the set of NetCDF data. The set of established data may be established by storing metadata (e.g., dimension quantity of NetCDF data, dimension set of NetCDF data, variable quantity of NetCDF data). The group of dimensions may be arranged in a row-major format. As an example, Row 1 may include data related to temperature, Row 2 may include data related to sea-level, Row 3 may include data related to carbon percentage, and the like. An index may be created for a specific dimension set. As an example, the processing engine may store "Row 3: carbon percentage" in an index for future processing. A group of variables may be organized in column-major format. As an example, Column 1 may include data related to the United States, Column 2 may include data related to France, Column 3 may include data related to Canada, and the like.

A set of variable-length offsets may be traversed using a hybrid columnar technique to locate a variable value related to a particular dimension. As an example, it may be desired to quickly locate data related to sea-level in the United States. The set of established data may be filtered and indexed. The desired data may be located in Row 2, Column 1. The processing engine may process (e.g., perform a set of operations) on only the relevant data (e.g., Row 2/Column 1) instead of the entire data set. The set of operations may include a Select operation, an Aggregate operation, a mapping operation, a Join operation, SQL operations, or other operations. In this way, large volumes of NetCDF data may be processed without requiring a large amount of memory or processing time. Other examples of using NetCDF data management to process large volumes of data at scale may also be possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method of Network Common Data Form (NetCDF) data management using a shared pool of configurable computing resources, the method comprising:
    building, to access a set of NetCDF data, a processing engine by:
        compiling a data frame software framework, and
        compiling a Java library software framework;
    receiving, by the processing engine, the set of NetCDF data;
    establishing, using the processing engine, a set of established data derived from the set of NetCDF data by:
        storing metadata which indicates a dimension quantity, a unique dimension set quantity, and a variable quantity,
        arranging a group of dimensions in a row-major format to have a group of in-sequence individual dimension sets,
        creating an index for a specific dimension set of the group of in-sequence individual dimension sets, and
        organizing a group of variables in a column-major format to have a group of in-sequence variable values which correspond to the group of in-sequence individual dimension sets; and
    processing, in a distributed fashion using the shared pool of configurable computing resources and the processing engine, a set of operations on the set of established data.

2. The method of claim 1, further comprising:
    building, to access the set of NetCDF data, the processing engine by:
        compiling, to form the processing engine as a set of computing objects, an Apache Spark framework, and
        compiling, to form the processing engine as the set of computing objects, the Java library software framework from a Unidata tool.

3. The method of claim 1, further comprising:
transforming, using the processing engine, the set of NetCDF data to the set of established data, wherein the set of established data has a tuple-table format.

4. The method of claim 1, further comprising:
compiling the data frame software framework by:
introducing, to a data frame reader module and a data frame writer module, a set of implementation code to access the set of NetCDF data.

5. The method of claim 1, further comprising:
compiling the data frame software framework by:
constructing, in an external library, a data frame implementation for NetCDF data.

6. The method of claim 5, further comprising:
compiling the data frame software framework by:
loading, from the external library into the data frame software framework, the data frame implementation for NetCDF data.

7. The method of claim 1, further comprising:
performing an operation selected from the group consisting of:
partitioning the set of established data in a horizontal fashion based on the group of dimensions;
filtering the set of established data based on the group of dimensions;
appending, using a separate loading process without otherwise modifying the set of established data, at least one dimension; and
sharing, using the index, one or more dimensions across one or more variables.

8. The method of claim 1, further comprising:
performing an operation selected from the group consisting of:
carrying-out a Select operation based on one or more specific variables;
carrying-out an Aggregate operation on the one or more specific variables;
linking, using the index, one or more dimensions and one or more positions of the one or more specific variables to subsequently carry-out a mapping operation; and
carrying-out a Join operation which includes adding the one or more specific variables.

9. The method of claim 1, further comprising:
enabling, using a custom adapter, a set of Structured Query Language (SQL) operations on the set of established data.

10. The method of claim 1, further comprising:
resolving an in-memory data structure to access the set of NetCDF data; and
tuning, to a processing architecture of a parallel computing framework of Apache Spark, the in-memory data structure to access the set of NetCDF data.

11. The method of claim 1, further comprising:
traversing, using a hybrid columnar technique to store data in memory, a set of variable-length offsets to locate a variable value related to a particular dimension of a group of dimensions;
partitioning, based on one or more variables, the set of established data to scale the established data to facilitate throughput; and
generating, utilizing the hybrid columnar technique, a cluster of data chunks to process a set of bounded operations.

12. The method of claim 1, further comprising:
traversing, using a hybrid columnar technique to store data in memory, a set of variable-length offsets to locate a variable value related to a particular dimension of a group of dimensions;
filtering, utilizing the hybrid columnar technique, the set of established data;
indexing, using the processing engine, the set of established data when establishing the set of established data;
carrying-out, utilizing the hybrid columnar technique, a Join operation; and
partitioning, based on one or more variables, the set of established data to scale the established data to facilitate throughput.

13. The method of claim 1, further comprising:
executing, in a dynamic fashion to streamline management of the NetCDF data using the shared pool of configurable computing resources, each of:
the building, the receiving, the establishing, and the processing.

14. The method of claim 1, further comprising:
executing, in an automated fashion without user intervention, each of:
the building, the receiving, the establishing, and the processing.

15. A system for NetCDF data management using a shared pool of configurable computing resources, the system comprising:
a memory having a set of computer readable computer instructions, and
a processor for executing the set of computer readable instructions, the set of computer readable instructions including:
building, to access a set of NetCDF data, a processing engine by:
compiling a data frame software framework, and
compiling a Java library software framework;
receiving, by the processing engine, the set of NetCDF data;
establishing, using the processing engine, a set of established data derived from the set of NetCDF data by:
storing metadata which indicates a dimension quantity, a unique dimension set quantity, and a variable quantity,
arranging a group of dimensions in a row-major format to have a group of in-sequence individual dimension sets,
creating an index for a specific dimension set of the group of in-sequence individual dimension sets, and
organizing a group of variables in a column-major format to have a group of in-sequence variable values which correspond to the group of in-sequence individual dimension sets; and
processing, in a distributed fashion using the shared pool of configurable computing resources and the processing engine, a set of operations on the set of established data.

16. A computer program product for NetCDF data management using a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:

building, to access a set of NetCDF data, a processing engine by:
  compiling a data frame software framework, and
  compiling a Java library software framework;
receiving, by the processing engine, the set of NetCDF data;
establishing, using the processing engine, a set of established data derived from the set of NetCDF data by:
  storing metadata which indicates a dimension quantity, a unique dimension set quantity, and a variable quantity,
  arranging a group of dimensions in a row-major format to have a group of in-sequence individual dimension sets,
  creating an index for a specific dimension set of the group of in-sequence individual dimension sets, and
  organizing a group of variables in a column-major format to have a group of in-sequence variable values which correspond to the group of in-sequence individual dimension sets; and
processing, in a distributed fashion using the shared pool of configurable computing resources and the processing engine, a set of operations on the set of established data.

* * * * *